(12) United States Patent
Liu et al.

(10) Patent No.: US 9,740,030 B2
(45) Date of Patent: Aug. 22, 2017

(54) NEAR-EYE DISPLAY SYSTEMS, DEVICES AND METHODS

(71) Applicant: OmniVision Technologies, Inc., Santa Clara, CA (US)

(72) Inventors: Yi-Wei Liu, New Taipei (TW); Wei-Feng Huang, Saratoga, CA (US); Yen-Sung Wang, Taipei (TW); Chun-Sheng Fan, HsinChu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 250 days.

(21) Appl. No.: 14/278,474

(22) Filed: May 15, 2014

(65) Prior Publication Data

US 2014/0347572 A1 Nov. 27, 2014

Related U.S. Application Data

(60) Provisional application No. 61/826,822, filed on May 23, 2013.

(51) Int. Cl.
*G02F 1/1335* (2006.01)
*G02C 11/00* (2006.01)
(Continued)

(52) U.S. Cl.
CPC .......... *G02C 11/10* (2013.01); *G02B 27/0172* (2013.01); *G02B 27/0176* (2013.01);
(Continued)

(58) Field of Classification Search
CPC ........ G02B 27/0172; G02B 2027/0178; G02C 7/088; G02F 2001/13355
See application file for complete search history.

(56) References Cited

U.S. PATENT DOCUMENTS 660,990 A 10/1900 Houghton
2,832,114 A 4/1958 Mead
(Continued)

FOREIGN PATENT DOCUMENTS

CN 101014896 A 8/2007
CN 101490606 A 7/2009
(Continued)

OTHER PUBLICATIONS

Translation of the First Office Action corresponding to Chinese Patent Application No. 201410221982.7, mailed May 5, 2016, 8 pages.
(Continued)

*Primary Examiner* — Paisley L Arendt
(74) *Attorney, Agent, or Firm* — Lathrop & Gage LLP

(57) ABSTRACT

A near-eye display device includes (a) a display unit having a liquid-crystal-on-silicon (LCOS) display and a first polarizing beam splitter interface for (i) reflecting illumination light from an illumination module towards the liquid-crystal-on-silicon display and (ii) transmitting display light from the LCOS display based on the illumination light, and (b) a viewing unit having an imaging objective that forms an image of the LCOS display for the pupil based on the display light, and a second polarizing beam splitter interface for (i) reflecting reflected display light from the imaging objective towards the pupil and (ii) transmitting ambient light from an ambient scene towards a pupil, the second polarizing beam splitter interface and the first polarizing beam splitter interface being orthogonal to a common plane.

16 Claims, 26 Drawing Sheets

(51) Int. Cl.
G02B 27/01 (2006.01)
G02F 1/1333 (2006.01)
G02F 1/1362 (2006.01)
G02C 7/08 (2006.01)

(52) U.S. Cl.
CPC ............ *G02C 11/00* (2013.01); *G02F 1/1362* (2013.01); *G02F 1/133351* (2013.01); *G02F 1/133528* (2013.01); *G02B 2027/0178* (2013.01); *G02C 7/088* (2013.01); *G02C 2200/02* (2013.01); *G02C 2200/22* (2013.01); *G02F 2001/13355* (2013.01); *Y10T 24/32* (2015.01); *Y10T 29/49* (2015.01); *Y10T 29/49787* (2015.01); *Y10T 29/49813* (2015.01)

(56) References Cited

U.S. PATENT DOCUMENTS

| | | | |
|---|---|---|---|
| 3,266,111 | A | 8/1966 | Abel |
| 3,600,069 | A | 8/1971 | McNeill |
| 5,159,639 | A | 10/1992 | Shannon et al. |
| 5,664,293 | A | 9/1997 | Bartoo |
| 5,886,822 | A | 3/1999 | Spitzer |
| 6,542,298 | B1 | 4/2003 | Aoki |
| 6,747,611 | B1 | 6/2004 | Budd et al. |
| 6,992,718 | B1 | 1/2006 | Takahara |
| 7,419,260 | B1 | 9/2008 | Wang |
| 7,675,684 | B1* | 3/2010 | Weissman .......... G02B 27/0172 359/630 |
| 7,735,996 | B2 | 6/2010 | van der Zwan et al. |
| D624,111 | S | 9/2010 | Knoop |
| 8,159,751 | B2 | 4/2012 | Martins |
| D659,741 | S | 5/2012 | Heinrich et al. |
| D664,185 | S | 7/2012 | Heinrich et al. |
| 8,373,690 | B2 | 2/2013 | Kurozuka |
| 8,388,138 | B1 | 3/2013 | Boothroyd |
| 8,508,851 | B2 | 8/2013 | Miao et al. |
| 2006/0055866 | A1 | 3/2006 | Dietz |
| 2007/0251062 | A1 | 11/2007 | Saitoh et al. |
| 2008/0278812 | A1* | 11/2008 | Amitai .................. G02B 6/00 359/485.05 |
| 2008/0284720 | A1 | 11/2008 | Fukutome |
| 2009/0007388 | A1 | 1/2009 | Villeneuve |
| 2012/0032205 | A1 | 2/2012 | O'Connor et al. |
| 2012/0038549 | A1 | 2/2012 | Mandella et al. |
| 2012/0081658 | A1 | 4/2012 | Sugihara et al. |
| 2013/0016292 | A1* | 1/2013 | Miao .................... G02B 27/283 349/11 |
| 2013/0021658 | A1 | 1/2013 | Miao et al. |
| 2013/0050070 | A1 | 2/2013 | Lewis et al. |
| 2013/0083403 | A1* | 4/2013 | Takagi ............... G02B 27/0172 359/618 |
| 2013/0113973 | A1* | 5/2013 | Miao .................... G09G 3/003 348/333.01 |
| 2013/0114039 | A1 | 5/2013 | Zelazowski |
| 2013/0235331 | A1 | 9/2013 | Heinrich et al. |
| 2013/0250232 | A1 | 9/2013 | Belbey et al. |
| 2013/0314303 | A1 | 11/2013 | Osterhout et al. |
| 2015/0234201 | A1 | 8/2015 | Levesque |

FOREIGN PATENT DOCUMENTS

| | | |
|---|---|---|
| CN | 101963744 A | 2/2011 |
| CN | 202758142 U | 2/2013 |
| TW | 201415088 A | 4/2014 |
| WO | 9923525 | 5/1999 |
| WO | 00/55676 A1 | 9/2000 |
| WO | 2008008646 A2 | 1/2008 |

OTHER PUBLICATIONS

Translation of the First Office Action corresponding to Chinese Patent Application No. 201410221984.6, mailed May 27, 2016, 3 pages.
Baranski, et al., "Wafer-Level Fabrication of Microcube-Typed Beam-Splitters by Saw-Dicing of Glass Substrate," IEEE Photonics Technology Letters, vol. 26, No. 1, Jan. 1, 2014.
Chuang, et al., "Application of the Inclined Exposure and Molding Process to Fabricate a Micro Beam-Splitter With Nanometer Roughness," Microsyst Technology vol. 19, pp. 461-470, Dec. 23, 2012.
Li, et al., "Visible Broadband, Wide-Angle, Thin-Film Multilayer Polarizing Beam Splitter," Applied Optics, vol. 35, No. 13, pp. 2221-2225, May 1, 1996.
Taiwanese Patent Application 103117949 Notice of Allowance dated Apr. 1, 2015, 4 pages.
Chinese Patent Application 201410222332.4 Office Action dated May 15, 2015, 8 pages.
U.S. Appl. No. 14/278,438 Office Action dated Oct. 6, 2015, 8 pages.
Chinese Patent Application No. 201410222332.4 Notice of Allowance dated Dec. 17, 2015, 5 pages.
Taiwanese Patent Application No. 103117947 Office Action dated Aug. 27, 2015, with English translation, 10 pages.
Taiwanese Patent Application No. 103117947 Notice of Allowance dated Dec. 11, 2015, 3 pages.
Machine translation of Taiwanese Patent No. TW201415088, publication date Apr. 16, 2014, 13 pages.
Taiwanese patent application No. 103117953, Notice of Allowance, dated Mar. 3, 2016, 3 pages.
U.S. Appl. No. 14/278,438, Notice of Allowance, dated Mar. 7, 2016, 10 pages.
Chinese Patent Application No. 201410222138.6, First Office Action, dated Mar. 3, 2016, 12 pages.
Office Action corresponding to U.S. Appl. No. 14/278,452, mailed Aug. 18, 2016.
English translation of the second Office Action corresponding to Chinese Application No. 201410222138.6 dated Aug. 18, 2016, 12 pages.
Translation of the 1st Office Action corresponding to Taiwanese Patent Application No. 103117954, dated Jun. 27, 2016, 3 pages.
Non Final Office Action corresponding to U.S. Appl. No. 14/278,407, dated Jul. 21, 2016. 9 pages.
Translation of the Third Office Action corresponding to Chinese Patent Application No. 201410222138.6, mailed Dec. 2, 2016, 13 pages.
Office Action corresponding to U.S. Appl. No. 14/278,407, mailed Jan. 26, 2017.
Office Action corresponding to Chinese Application No. 201410221982.7, dispatched Jan. 24, 2017—English translation provided only.
Chinese Patent Application No. 201410222138.3 English translation of Rejection Decision dated May 18, 2017, 13 pages.

* cited by examiner

NEAR-EYE DISPLAY SYSTEMS, DEVICES AND METHODS

RELATED APPLICATIONS

This application claims priority from U.S. Provisional Application Ser. No. 61/826,822, filed May 23, 2013, which is incorporated by reference herewith.

BACKGROUND

Head-mounted display systems mount to the head of a user and allow the user to view the display or an image thereof. Generally, the display functions as a conveniently located interface with a computer, which may be included in the head-mounted display system. For example, a head-mounted display system may provide an aircraft pilot with maps and other information related to the real scene viewed by the pilot. Some head-mounted display systems allow the user to view a display image at the same time as viewing a real scene. See-through head-mounted display systems overlay a display image on a real scene viewed by the user. Recent advances in micro-optics manufacturing have resulted in the development of see-through head-mounted display systems targeted for the consumer market, where the display system may provide functionality similar to that of a smartphone. For example, U.S. Patent Application Publication No. US 2013/0021658 discusses a see-through head-mounted display system.

SUMMARY

In an embodiment, a near-eye display device includes (a) a display unit having a liquid-crystal-on-silicon (LCOS) display and a first polarizing beam splitter interface for (i) reflecting illumination light from an illumination module towards the liquid-crystal-on-silicon display and (ii) transmitting display light from the LCOS display based on the illumination light, and (b) a viewing unit having an imaging objective that forms an image of the LCOS display for the pupil based on the display light, and a second polarizing beam splitter interface for (i) reflecting reflected display light from the imaging objective towards the pupil and (ii) transmitting ambient light from an ambient scene towards a pupil, the second polarizing beam splitter interface and the first polarizing beam splitter interface being orthogonal to a common plane.

In an embodiment, a see-through near-eye display device, for mounting in field of view of a pupil of a user, includes (a) a viewing unit for superimposing a display image, formed by the display device, on an ambient scene, and (b) a neutral density filter for adjusting brightness of ambient light received by the viewing unit from the ambient scene to adjust contrast of the display image relative to the ambient scene.

In an embodiment, a method for superimposing a display image on an ambient scene, viewed by a pupil of a user, includes (a) illuminating a liquid-crystal-on-silicon (LCOS) display by reflecting illumination light, using a first polarizing beam splitter interface, from a light source to the display, and (b) merging, using a second polarizing beam splitter interface, ambient light from the ambient scene with display light from the display, transmitted by the first polarizing beam splitter interface, to superimpose an image of the LCOS display on the ambient scene, the second polarizing beam splitter interface and the first polarizing beam splitter interface being orthogonal to a common plane.

In an embodiment, a wafer-level method for manufacturing a near-eye display device includes (a) forming a polarizing beam splitter wafer, including a polarizing beam splitter wafer having a plurality of polarizing beam splitter film bands, (b) bonding the polarizing beam splitter wafer to an active-matrix wafer to font a stacked wafer, wherein the active-matrix wafer includes a plurality of active matrices that each have functionality for forming a liquid-crystal-on-silicon (LCOS) display, and (c) dicing the stacked wafer to singulate optical elements, wherein each of the optical elements have an active matrix and a polarizing beam splitter film band for reflecting light towards the active matrix and transmitting light received from direction of the active matrix.

BRIEF DESCRIPTION OF THE DRAWINGS

The foregoing and other features and advantages of the disclosure will be apparent from the more particular description of embodiments, as illustrated in the accompanying drawings, in which like reference characters refer to the same parts throughout the different figures. The drawings are not necessarily to scale, emphasis instead being placed upon illustrating the principles of the disclosure.

DETAILED DESCRIPTION OF THE EMBODIMENTS

Figure 1:
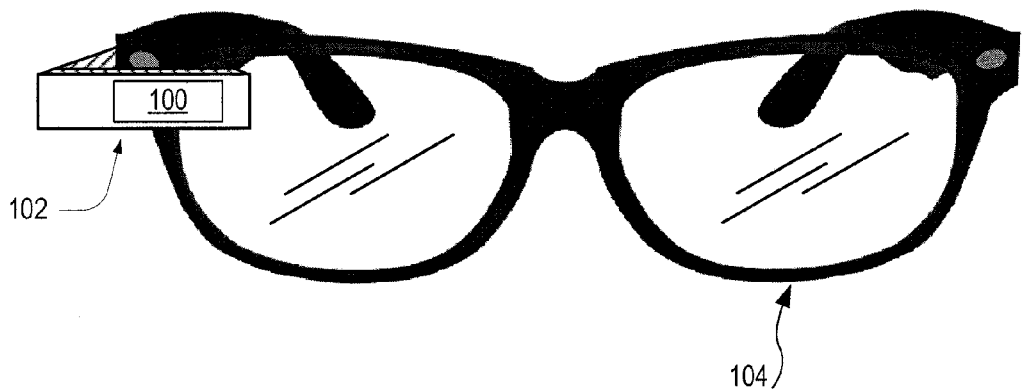
FIG. 1 illustrates a near-eye display system, according to one embodiment.

FIG. 1 illustrates one exemplary near-eye display system 102, including a near-eye display device 100. Near-eye display system 102 positions near-eye display device 100 within the field of view of one pupil of a user and, in the example illustrated in FIG. 1, near-eye display system 102 mounts to a glasses frame 104 worn by the user. Alternatively, near-eye display system 102 is mounted to a helmet worn by the user, the head or shoulder of a user, or otherwise placed such that near-eye display device 100 is in the field of view of one pupil of the user. Near-eye display device 100 is for example a see-through display device that superimposes a display image on an ambient scene viewed by the user.

Also disclosed herein are embodiments of near-eye display device 100, which advantageously provide high image quality and viewing comfort. For example, near-eye display device 100 may include a neutral density filter for adjusting brightness of light from the ambient scene in the field of view area associated with the display image, such that the display image has good contrast relative to the ambient scene. Near-eye display device 100 may utilize efficient illumination of the display to provide a bright display image while maintaining low power consumption, as well as polarization filtering to reduce stray light effects. In an embodiment, display system 102 includes a fixture with multiple degrees of freedom for aligning the near-eye display device 100 with respect to the field of view of the pupil. The fixture thus allows for achieving a desired positioning of the display image and eliminating, or reducing, keystone distortion. This is particularly advantageous if display system 102 is intended to be compatible with different types of holders, such as different examples of glasses frame 104. Portions of the near-eye display device 100 may be manufactured according to wafer-level methods disclosed herein.

Figure 2:
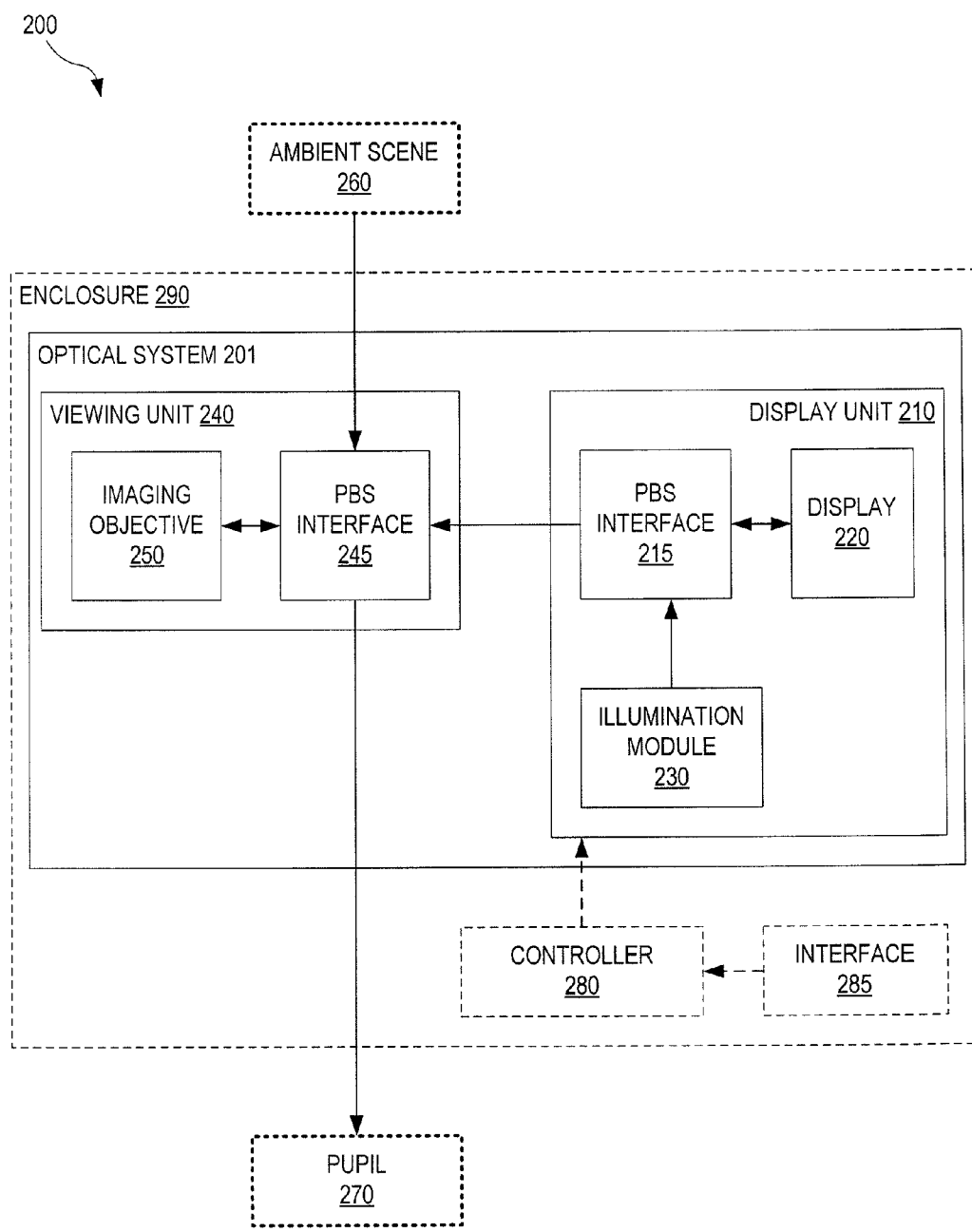
FIG. 2 illustrates a block diagram of the components of an exemplary near-eye display device, according to an embodiment.

FIG. 2 illustrates a block diagram of the components of one exemplary near-eye display device 200. Display device 200 is for example an embodiment of near-eye display device 100 of FIG. 1. Display device 200 includes an optical system 201 that utilizes polarization sensitive elements to superimpose a display image on an ambient scene 260 viewed by a pupil 270 of a user. Optical system 201 includes a display unit 210 and a viewing unit 240. Optionally, display device 200 includes an enclosure 290 for housing at least optical system 201.

Display unit 210 includes a display 220, an illumination module 230 for illuminating display 220, and a polarizing beam splitter (PBS) interface 215. PBS interface 215 directs at least a portion of illumination light generated by illumination module 230 towards display 220, and transmits at least a portion of light from display 220 towards viewing unit 240. In an embodiment, display 220 is a liquid-crystal-on-silicon (LCOS) display. In an embodiment, illumination module 230 includes a light emitting diode (LED) based light source, such as an RGB LED module for generating red, blue, and green light. In this embodiment, display 220 and illumination module 230 may cooperate to provide a color display.

Viewing unit 240 superimposes an image of display 220 on ambient scene 260 viewed by pupil 270. Viewing unit 204 includes a PBS interface 245 and an imaging objective 250. Imaging objective 250 forms an image of display 220. In certain embodiments, the display image thus formed by imaging objective 250 is a virtual image located a distance away from pupil 270, optionally externally to display device 200. The virtual image may be formed at infinity or at a finite distance from pupil 270. PBS interface 245 transmits at least a portion of light from ambient scene 260 propagating towards pupil 270. Thus, PBS interface 245 provides see-through functionality for display device 200. PBS interface 245 further transmits at least a portion of light from display unit 210 to imaging objective 250, and reflects at least a portion of light from imaging objective 250 towards pupil 270.

In an embodiment, PBS interfaces 215 and 245 are orthogonal to a common plane. In this embodiment, PBS interfaces 215 and 245 may be configured to transmit the same type of polarization, such that no polarization rotation is required between PBS interfaces 215 and 245. In an embodiment, PBS interfaces 215 and 245 are configured for transmitting p-polarization and reflecting s-polarization. One or both of PBS interfaces 215 and 245 may be implemented in display device 200 as beam-splitter cubes.

Optionally, display device 200 includes a controller 280 for controlling portions of optical system 201. For example, controller 280 controls illumination module 230 and display 220. Display device 200 may further include an interface 285 for communicating with a user and/or an external computer system. Interface 285 may include a voice interface and/or a touch interface, such as a keypad or a touchpad, for receiving instructions from a user. Through controller 280, such instructions may affect the image formed on display 220. Alternatively, or in combination therewith, interface 285 may include a sound interface for communicating to the user. While FIG. 2 illustrates controller 280 and interface 285 as being included in display device 200, one or both of controller 280 and interface 285, or portions thereof, may be located externally to display device 200, without departing from the scope hereof. For example, with display device 200 implemented in near-eye display system 102 (FIG. 1) as display device 100, controller 280 and interface 285 may be located in portions of near-eye display system 102 different from display device 100. Although not illustrated in FIG. 2, elements of display device 200 may be powered by a battery incorporated in display device 200, or receive power through, for example, interface 285, without departing from the scope hereof.

Figure 3:
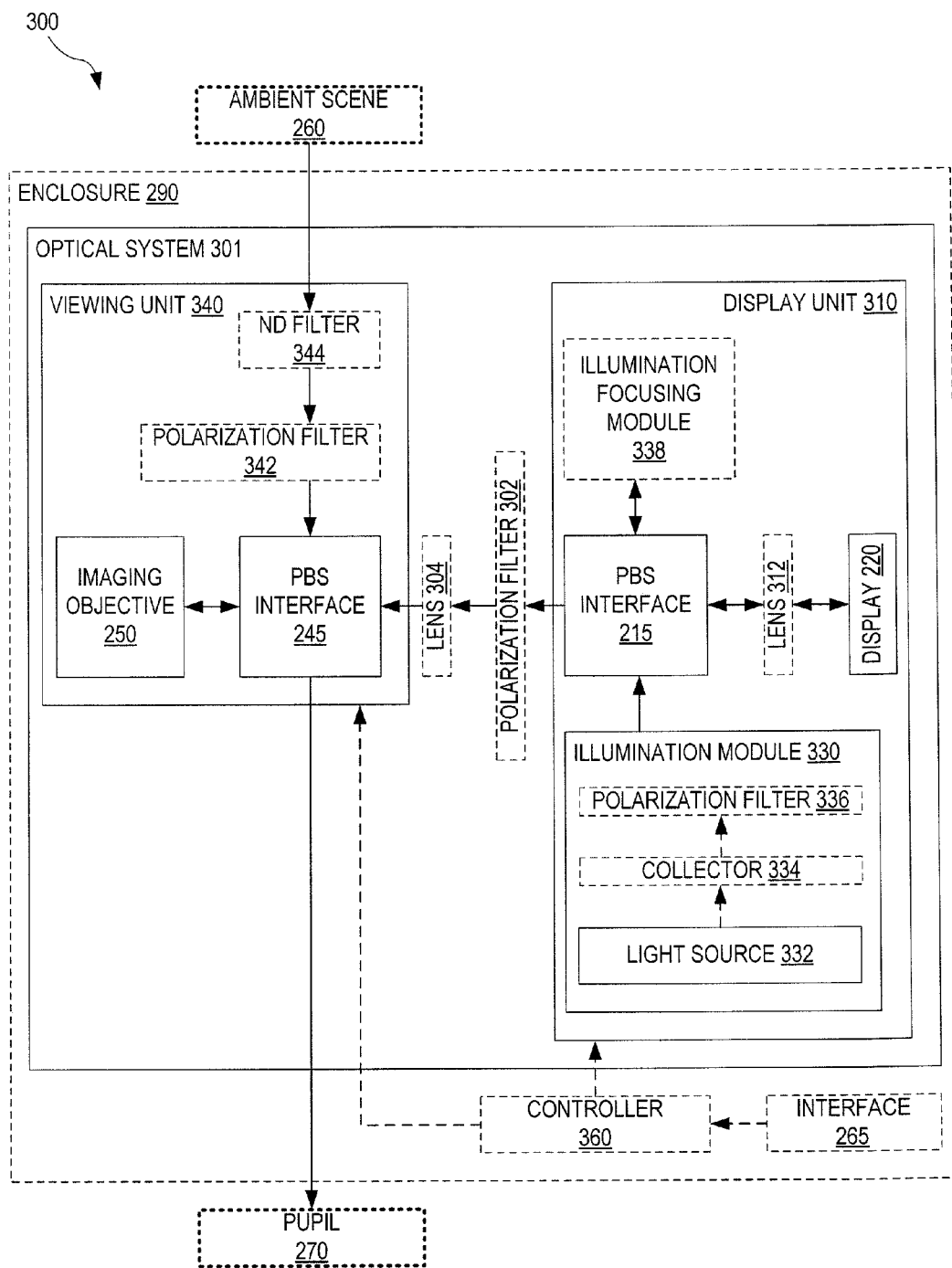
FIG. 3 illustrates an embodiment of the near-eye display device of FIG. 2, with added functionality providing higher-quality display images.

FIG. 3 illustrates one exemplary near-eye display device 300, which is near-eye display device 200 of FIG. 2 disclosed in greater detail. Display device 300 includes added functionality that may serve to superimpose a higher-quality display image on ambient scene 260 (FIG. 2) viewed by pupil 270 (FIG. 2). Display device 300 includes an optical system 301, which is optical system 201 (FIG. 2) disclosed in greater detail. Optical system 301 includes a display unit 310 and a viewing unit 340, which are display unit 210 and viewing unit 240, respectively, of FIG. 2 disclosed in greater detail. Optionally, display device 300 includes enclosure 290 of FIG. 2.

Display unit 310 includes PBS interface 215 and display 220 as described above in FIG. 2. Display unit 310 further includes an illumination module 330, including a light source 332, which is illumination module 230 (FIG. 2) disclosed in greater detail. In an embodiment, light source 332 is a light emitting diode (LED) based light source, such as an RGB LED module for generating red, blue, and green light. In this embodiment, display 220 and illumination module 330 may cooperate to provide a color display. Viewing unit 340 includes PBS interface 245 and imaging objective 250 as described above with respect to FIG. 2.

In an embodiment, illumination module 330 includes a collector 334 for collecting light emitted by 334 and directing the collected light towards PBS interface 215. Collector 334 may increase the fraction of the light, generated by light source 332, which reaches display 220. Hence, collector 334 may facilitate formation of a brighter display image and/or reduce power consumption, as compared to illumination modules that do not include collector 334. Similarly, in an embodiment, display unit 310 includes an illumination focusing module 338, which serves to direct a greater fraction of the light, emitted by illumination module 330, towards display 220, as compared to display units not including illumination focusing module 338. Hence, illumination focusing module 338 facilitates formation of a brighter display image and/or reduces power consumption, as compared to display units not including illumination focusing module 338.

In an embodiment, viewing unit 340 includes a neutral density (ND) filter 344 for adjusting the brightness of light propagating towards pupil 270 from ambient scene 260. Accordingly, ND filter 344 may serve to provide improved contrast of the display image relative to the ambient scene. For example, if ambient scene 260 is very bright, which may be the case if display device 300 is operated in a brightly lit environment, ND filter 344 may reduce the brightness of ambient scene 260 in the portion of the field of view of pupil 270 that is occupied by the display image. In a system without ND filter 344, it may be necessary to increase the power of the light source illuminating display 220, such as light source 332, which increases power consumption by display device 300. Accordingly, ND filter 344 may offer an energy efficient solution to achieving good contrast of the display image relative to the ambient scene, which is particularly advantageous for embodiments of display device 300 that are battery powered.

In an embodiment, ND filter 344 has a fixed transmission coefficient. In another embodiment, ND filter 344 is a variable neutral density filter. ND filter 344 may be a mechanically variable ND filter. For example, ND filter 344 may include two polarizer plates, wherein the orientation of at least one of the two polarizer plates may be adjusted to control the overall transmission coefficient of the pair of polarizer plates. Alternatively, ND filter 344 may be an electronically variable ND filter. In certain embodiments, ND filter 344 includes a twisted nematic mode liquid crystal device, which controls the transmission coefficient through the twisted nematic effect in a liquid crystal layer. The transmission properties of the liquid crystal layer depend on an applied voltage. Therefore, the transmission of the liquid crystal layer may be controlled electronically. In one embodiment, the twisted nematic mode liquid crystal device is operated in a binary mode, in which the device either transmits or blocks light. Variable transmission of ND filter 344 may then be achieved by alternating between transmitting and blocking configurations with a variable duty-cycle. In another embodiment, the twisted nematic mode liquid crystal device includes an array of independently controllable twisted nematic mode liquid crystal pixels, each operating in a binary mode wherein a pixel either transmits of blocks light. In this case, variable transmission of ND filter 344 may be achieved by adjusting the fraction of pixels set to transmit light.

In an embodiment, display device 300 includes one or more polarization filters, in addition to PBS interfaces 215 and 245, for cleaning the polarization state of light passing therethrough. Although each of PBS interfaces 215 and 245 act as polarization filters, PBS interfaces 215 and 245 may not provide perfect polarization filtering. Imperfect polarization filtering potentially leads to stray light effects in the display image superimposed on ambient scene 260. For example, a small fraction of light emitted by illumination module 330 may propagate to viewing unit 340 and appear in the display image formed by imaging objective 250. Likewise a small fraction of light received from ambient scene 260 may be reflected by PBS interface 245 and thereby produce a stray light effect in the display image formed by imaging objective 250. To prevent or reduce such stray light effects, display device 300 may include one or more of polarization filters 302, 336, and 342.

Polarization filter 302 is located between PBS interfaces 215 and 245 to clean the polarization state of light passing therebetween. Polarization filter 302 may be disposed directly on the surface of PBS interface 215 or PBS interface 245.

Polarization filter 336 is located in illumination module 330 for cleaning the polarization state of light emitted by light source 332 prior to reaching PBS interface 215. Polarization filter 336 may be disposed directly on the surface of PBS interface 215.

Polarization filter 342 is located in viewing unit 340 and cleans the polarization state of light propagating towards PBS interface 245. Polarization filter 342 may be disposed directly on the surface of PBS interface 245. In embodiments of display device 300 that include ND filter 344, polarization filter 342 may be located between ND filter 344 and ambient scene 260, without departing from the scope hereof Although not illustrated in FIG. 3, embodiments of display unit 310 may include a polarization filter for blocking light transmitted by PBS interface 215 having polarization of the type that an ideal version of PBS interface 215 would have reflected, without departing from the scope hereof.

In an embodiment, display device 300 includes a lens or a lens system for changing the magnification of the display image superimposed on ambient scene 260. For example, display device 300 may include a lens 304 located between PBS interfaces 215 and 245. Lens 304 cooperates with imaging objective 250 to provide a different magnification of display image superimposed on ambient scene 260, as compared to the display image formed by display devices not including lens 304. Although not illustrated in FIG. 3, in embodiments of display device 300 that include polarization filter 302, lens 304 may be located between polarization filter 302 and PBS interface 215.

In another example, display device 300 includes a lens 312 located between display 220 and PBS interface 215. Lens 312 cooperates with imaging objective 250 to provide a different magnification of display image superimposed on ambient scene 260, as compared to the display image formed by display devices not including lens 312. Each of lenses 304 and 312 may include several lenses as well as other optical elements.

In an embodiment, display device 300 includes two or more of (a) ND filter 344, (b) one or more of polarization filters 302, 336, and 342, (c) illumination focusing module 338, (d) collector 334, and (e) one of lenses 304 and 312.

Optionally, display device 300 includes a controller 360 for controlling portions of optical system 301. Controller 360 is an embodiment of controller 280 (FIG. 2). For example, controller 360 controls illumination module 230 and display 220, and optionally ND filter 344. Display device 300 may further include interface 285 (FIG. 2) for communicating with a user and/or an external computer system, through controller 360. While FIG. 3 illustrates controller 360 and interface 285 as being included in display device 300, one or both of controller 360 and interface 285, or portions thereof, may be located externally to display device 300, without departing from the scope hereof. For example, with display device 300 implemented in near-eye display system 102 (FIG. 1) as display device 100, controller 360 and interface 285 may be located in portions of near-eye display system 102 different from display device 100.

Figure 4:
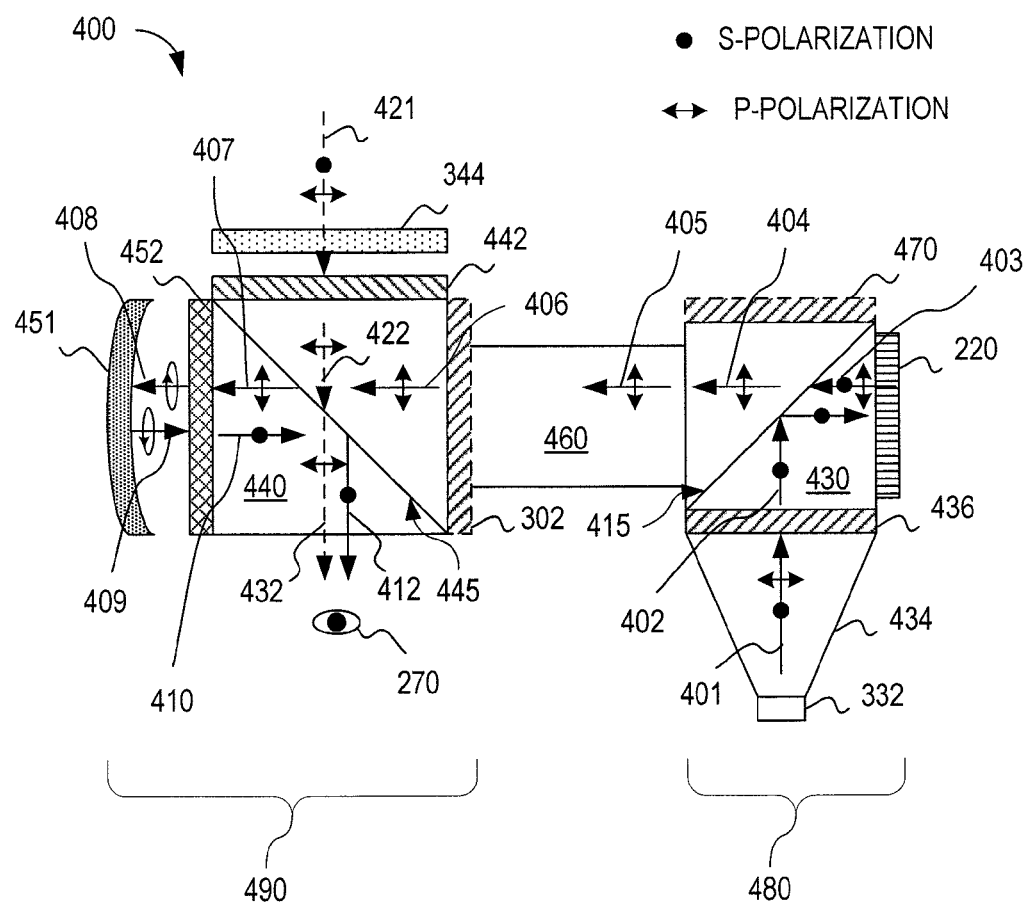
FIG. 4 illustrates an optical system for superimposing a display image on an ambient scene, according to an embodiment.

FIG. 4 illustrates one exemplary optical system 400, for use in a see-through near-eye display device, which includes a neutral density filter and additional polarization cleaning elements. Optical system 400 is an embodiment of optical system 301 (FIG. 3) that includes ND filter 344 (FIG. 3), a polarization filter 436, and a polarization filter 442. Polarization filters 436 and 442 are examples of polarization filters 336 and 342 of FIG. 3. Optical system 400 includes a display unit 480 and a viewing unit 490, which are similar to display unit 310 and viewing unit 340, respectively, of FIG. 3. Optical system 400 further includes a light tunnel 460 through which light may propagate from display unit 480 to viewing unit 490. Light tunnel 460 may be a solid material capable of transmitting light of a desired wavelength, such as visible light. For example, light tunnel 460 may be made of glass or an optical plastic, such as acrylic, polystyrene, polycarbonate, or polyolefin.

Display unit 480 includes a PBS element 430 having a PBS interface 415, which is an example of PBS interface 215 (FIGS. 2 and 3). Display unit 480 further includes light source 332 (FIG. 3), a light tunnel 434, which may be a solid taper, for directing light from light source 332 towards PBS element 430, and a polarization filter 436, which is an example of polarization filter 336 (FIG. 3) for cleaning the polarization state of light emitted by light source 332. Additionally, display unit 480 includes display 220 (FIGS. 2 and 3). Light tunnel 434 may be a solid material capable of transmitting light of a desired wavelength, such as visible light. For example, light tunnel 460 may be made of glass or an optical plastic, such as acrylic, polystyrene, polycarbonate, or polyolefin and may be tapered at an angle toward light source 332. In an embodiment, display 220 is an LCOS display.

Light source 332 emits light 401, which may be randomly polarized. Polarization filter 436 at least partially blocks p-polarized light components of light 401 to form s-polarized light 402 propagating towards PBS interface 415. The polarization state is defined with respect to PBS interface 415. PBS interface 415 reflects s-polarized light 402 towards display 220. At least a portion of s-polarized light 402 is re-emitted by display 220 as light 403. Display 220 changes the polarization state of incident s-polarized light 402, such that light 403 emitted by display 220 includes a p-polarized component. The p-polarized component of light 403 is at least partially transmitted by PBS interface 415 to produce p-polarized light 404. P-polarized light 404 enters light tunnel 460 and propagates therethrough to viewing unit 490 as p-polarized light 405. Display unit 480 may further include a polarization filter 470 for at least partially blocking portions of s-polarized light 402 leaking through PBS interface 415. Light source 332, light tunnel 434, and polarization filter 436 together form an example of illumination module 330 (FIG. 3).

In an embodiment, display 220, optionally polarization filter 470, and the illumination module formed by light source 332, light tunnel 434, and polarization filter 436 are bonded to faces of PBS element 430, wherein these faces are oriented at substantially 45 degrees to PBS interface 415. The location of the illumination module formed by light source 332, light tunnel 434, and polarization filter 436 may be swapped with the location of optional polarization filter 470, without departing from the scope hereof.

Light polarization state indicated herein refers to the ideal polarization state of the light, whereas the actual polarization state may include non-ideal components, without departing from the scope hereof. For example, p-polarized light 405 may include a small s-polarized component.

Viewing unit 490 includes a PBS element 440 having a PBS interface 445, which is an embodiment of PBS interface 245 (FIGS. 2 and 3). In an embodiment, PBS element 440 is a PBS cube. Viewing unit 490 further includes a curved reflector 451 and a quarter-wave plate 452. Together, curved reflector 451 and a quarter-wave plate 452 form an embodiment of imaging objective 250 (FIGS. 2 and 3). Curved reflector 451 may be a mangine mirror. Additionally, viewing unit 490 includes ND filter 344 (FIG. 3) and a polarization filter 442. Polarization filter 442 is an embodiment of polarization filter 342 (FIG. 3). Viewing unit 490 may further include polarization filter 302 (FIG. 3).

Viewing unit 490 receives p-polarized light 405 from light tunnel 460. P-polarized light 405 enters PBS element 440 and becomes p-polarized light 406, optionally after passing through polarization filter 302 configured to at least partially block s-polarized components of p-polarized light 405. PBS interfaces 445 and 415 are substantially orthogonal to a common plane. Therefore, light polarization state indicated with respect to PBS interface 445 is the same as light polarization state indicated with respect to PBS interface 415. P-polarized light 406 is transmitted by PBS interface 445 to form p-polarized light 407 propagating towards quarter-wave plate 452. Quarter-wave 452 rotates the polarization of p-polarized light 407 to form circularly polarized light 408. Curved reflector 451 reflects circularly polarized light 408 to form counter-circularly polarized light 409, the polarization of which is rotated by quarter-wave plate 452 to form s-polarized light 410. S-polarized light 410 is reflected by PBS interface 445 as s-polarized light 412 propagating towards pupil 270 (FIGS. 2 and 3).

Viewing unit 490 also receives light 421 from an ambient scene. At least a portion of light 421, which may be randomly polarized, is transmitted by ND filter 344, and filtered by polarization filter 442 to form p-polarized light 422. P-polarized light 422 is transmitted by PBS interface 445 and propagates towards pupil 270 as p-polarized light 432. Accordingly, pupil 270 sees an image of display 220, received by pupil 270 as s-polarized light, superimposed on an image of an ambient scene, received by pupil 270 as p-polarized light. In an embodiment, polarization filter 302, polarization filter 442, and quarter-wave plate 452 are bonded to faces of PBS element 440, wherein these faces are oriented at substantially 45 degrees to PBS interface 445.

Figure 5:
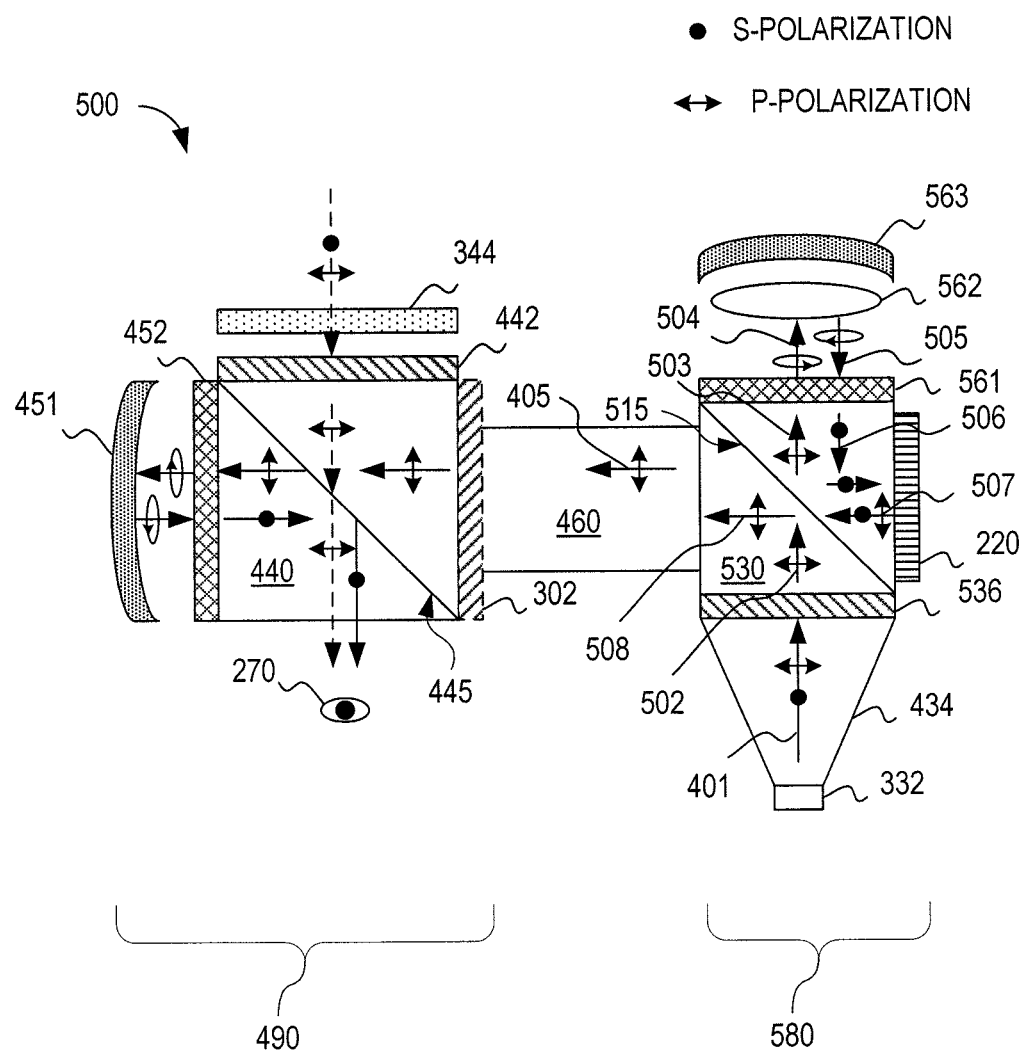
FIG. 5 illustrates an optical system for superimposing a display image on an ambient scene, and including an illumination focusing module providing improved display illumination efficiency, according to an embodiment.

FIG. 5 illustrates one exemplary optical system 500, for use in a see-through near-eye display device. Optical system 500 is an extension of optical system 400 of FIG. 4, which further includes an illumination focusing module for improving the efficiency of illumination of display 220 (FIGS. 2, 3 and 4). Optical system 500 is an embodiment of optical system 301 (FIG. 3) that includes ND filter 344 (FIG. 3), polarization filter 536, polarization filter 442 (FIG. 4), and an example of illumination focusing module 338 (FIG. 3). Polarization filter 536 is an example of polarization filter 336 (FIG. 3). Optical system 500 includes a display unit 580, light tunnel 460 (FIG. 4), and viewing unit 490 (FIG. 4). Display unit 580 is an embodiment of display unit 310 of FIG. 3.

Display unit 580 is similar to display unit 480 (FIG. 4). As compared to display unit 480 (FIG. 4), optional polarization filter 470 is replaced by an illumination focusing module that includes a quarter-wave plate 561, a lens 562 and a curved reflector 563. Lens 562 may be a lens system including multiple optical elements. Curved reflector 563 may be a mangin mirror. The illumination focusing module formed by quarter-wave plate 561, a lens 562 and a curved reflector 563 is an example of illumination focusing module 338 (FIG. 3).

Furthermore, within optical system 500, PBS element 430 of FIG. 4 is replaced by a PBS element 530, which includes a PBS interface 515. PBS interface 515 is an example of PBS interface 215 (FIGS. 2 and 3). PBS interface 515 is substantially parallel to PBS interface 445.

Polarization filter 536 blocks at least a portion of p-polarized light emitted by light source 332. Polarization filter 536 transmits a p-polarized component of light 401 (FIG. 4), emitted by light source 332, to form p-polarized light 502, where the polarization state is indicated with respect to PBS interface 515. P-polarized light 502 is transmitted by PBS interface 515 to form p-polarized light 503 propagating towards quarter-wave plate 561. Quarter-wave plate 561 rotates the polarization of p-polarized light 503 to form circularly polarized light 504, which passes through lens 562, is reflected by curved reflector 563, and passes through lens 562 to become counter-circularly polarized light 505. Quarter-wave plate 561 rotates the polarization of counter-circularly polarized light 505 to form s-polarized light 506. S-polarized light 506 is reflected by PBS interface 515 towards display 220. Display 220 changes the polarization state of incident s-polarized light 506, such that light 507 emitted by display 220 includes a p-polarized component. The p-polarized component of light 507 is at least partially transmitted by PBS interface 515 to produce p-polarized light 508. P-polarized light 508 enters light tunnel 460 and becomes p-polarized light 405 of FIG. 4.

Figure 6:
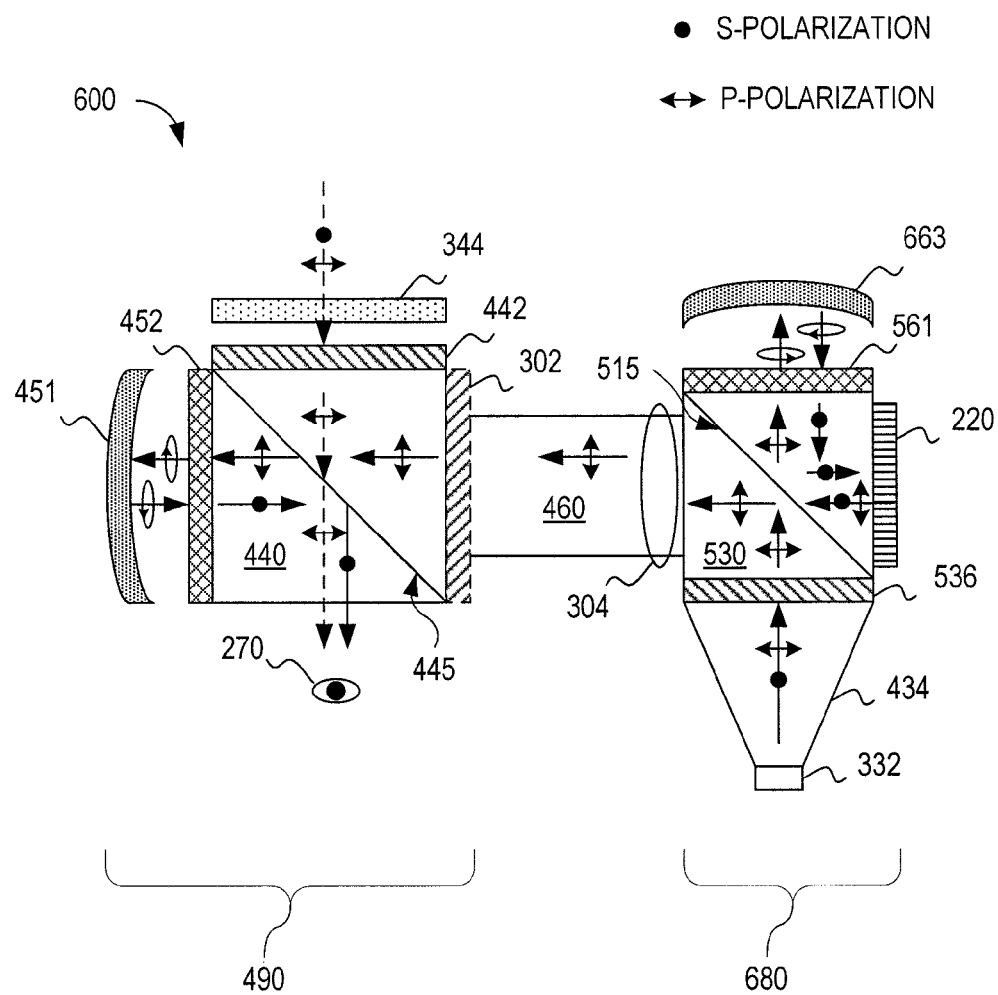
FIG. 6 illustrates an optical system for superimposing a display image on an ambient scene, including a lens for changing the magnification of the display image, according to an embodiment.

FIG. 6 illustrates one exemplary optical system 600, for use in a see-through near-eye display device. Optical system 600 is a modification of optical system 500 of FIG. 5, which further includes a lens for changing the magnification of the display image superimposed on the ambient scene. Optical system 600 is an embodiment of optical system 301 (FIG. 3) that includes lens 304 (FIG. 3), ND filter 344 (FIG. 3), polarization filter 536 (FIG. 5), polarization filter 442 (FIG. 4), and a curved reflector 663 for focusing illumination. Curved reflector 663 is an example of illumination focusing module 338 (FIG. 3) and may be a mangin mirror. Optical system 600 further includes a display unit 680, light tunnel 460 (FIG. 4), viewing unit 490 (FIG. 4), and lens 304 (FIG. 3).

Display unit 680 is an embodiment of display unit 310 of FIG. 3, and is similar to display unit 580 (FIG. 5). However, as compared to display unit 580 (FIG. 5), lens 562 is omitted. Lens 304 is placed between PBS elements 440 (FIG. 4) and 530 (FIG. 5). Lens 304 may be incorporated into light tunnel 460, display unit 680, or viewing unit 490 (FIG. 4).

Figure 7:
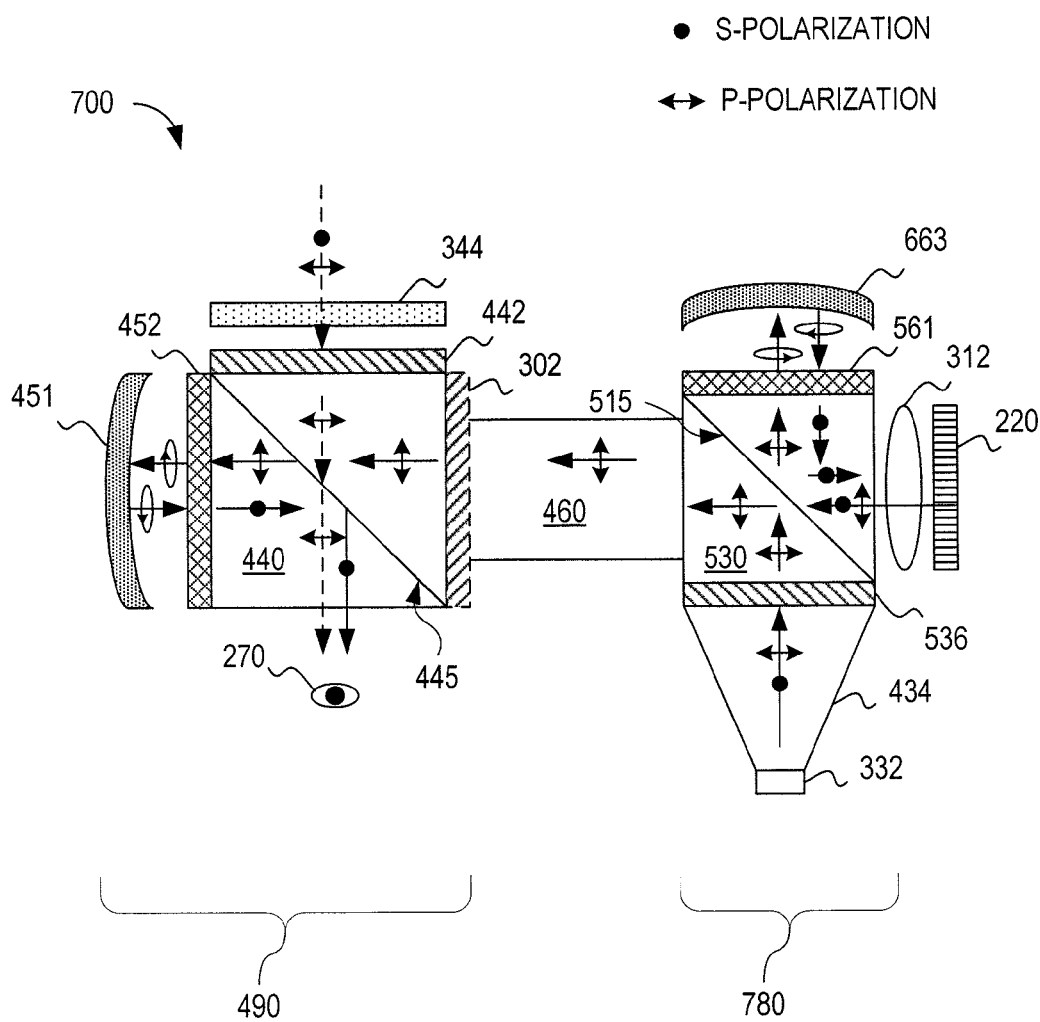
FIG. 7 illustrates another optical system for superimposing a display image on an ambient scene, including a lens for changing the magnification of the display image, according to an embodiment.

FIG. 7 illustrates one exemplary optical system 700, for use in a see-through near-eye display device. Optical system 700 is a modification of optical system 600 of FIG. 6, with a different position of the lens functioning to change the magnification of the display image superimposed on the ambient scene. Optical system 700 is an embodiment of optical system 301 (FIG. 3) that includes lens 312 (FIG. 3), ND filter 344 (FIG. 3), polarization filter 536 (FIG. 5), polarization filter 442 (FIG. 4), and curved reflector 663 (FIG. 6). Optical system 700 further includes a display unit 780, light tunnel 460 (FIG. 4), and viewing unit 490 (FIG. 4).

As compared to optical system 600 of FIG. 6, optical system 700 does not include lens 304. Instead optical system 700 includes lens 312 located between PBS element 530 (FIGS. 5 and 6) and display 220 (FIGS. 2, 3, and 6).

Figure 8:
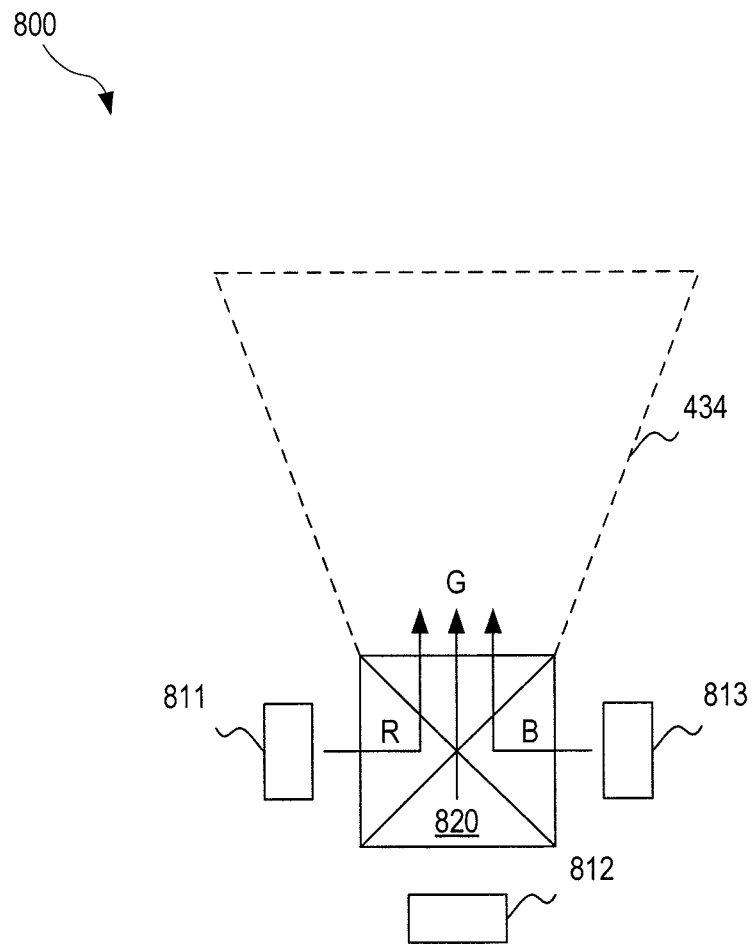
FIG. 8 illustrates a light source for illuminating the display of the display device of FIG. 2, according to an embodiment.

FIG. 8 illustrates one exemplary light source 800 for illuminating display 220 of FIG. 2. Light source 800 is an embodiment of light source 332 (FIG. 3) providing three different colors of light, which cooperate with display 220 (FIG. 2) to form a color display. Light source 800 includes a red LED 811, a green LED 812, a blue LED 813, and a cross dichroic prism 820 for combining light from red LED 811, green LED 812, and blue LED 813. Cross dichroic prism 820 may be attached to light tunnel or solid taper 434 (FIGS. 4 through 7).

Figure 9A:
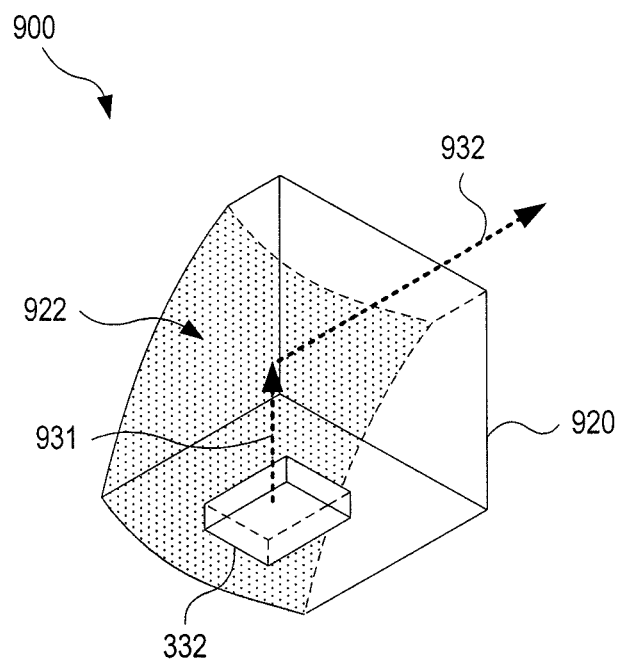
FIGS. 9A and 9B illustrate, in perspective view and cross-sectional side view, respectively, an illumination module, for use in the display device of FIG. 3, which includes a solid light collector with a curved surface for collecting and directing light from a light source towards the display, according to an embodiment.
Figure 9B:
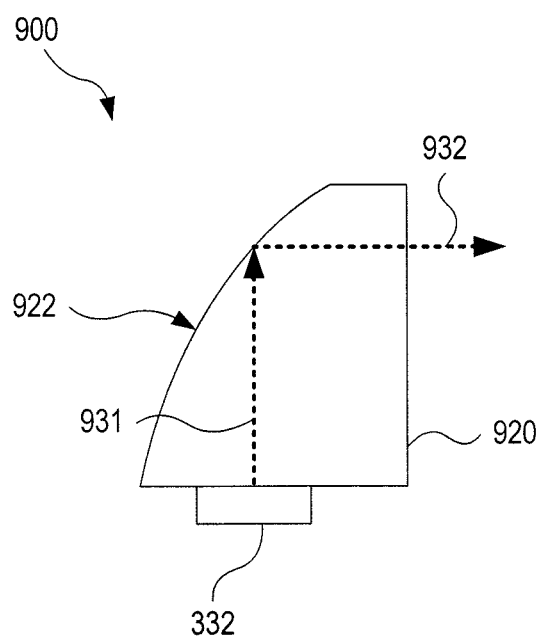

FIGS. 9A and 9B illustrate one exemplary illumination module 900, which is an embodiment of illumination module 330 (FIG. 3) including collector 334. Illumination module 900 includes light source 332 (FIG. 3) and a solid light collector 920, which is an embodiment of collector 334 (FIG. 3). FIG. 9A shows illumination module 900 in perspective view from a vantage point below light source 332. FIG. 9B shows illumination module 900 in cross-sectional side-view, where the cross section is in the plane defined by the general propagation directions of light through illumination module 900. FIGS. 9A and 9B are best viewed together.

Solid light collector 920 includes a curved surface 922 for internally reflecting light 931 emitted by light source 332. In FIG. 9, arrow 931 indicates a generally centered propagation direction of light emitted by light source 332. Light source 332 may emit light in a large solid angle. Curved surface 922 collects and focuses a large solid angle of light 931, emitted by light source 332, to form light 932. Light 932 has a general propagation direction, which is substantially orthogonal to that of light 931. Light 932 may include light propagation in a range of directions, defined by curved surface 922 and the emission properties of light source 332. Solid light collector 920 may be a solid material capable of transmitting light of a desired wavelength, such as visible light. For example, solid light collector 920 may be made of glass or an optical plastic, such as acrylic, polystyrene, polycarbonate, or polyolefin.

Figure 10A:
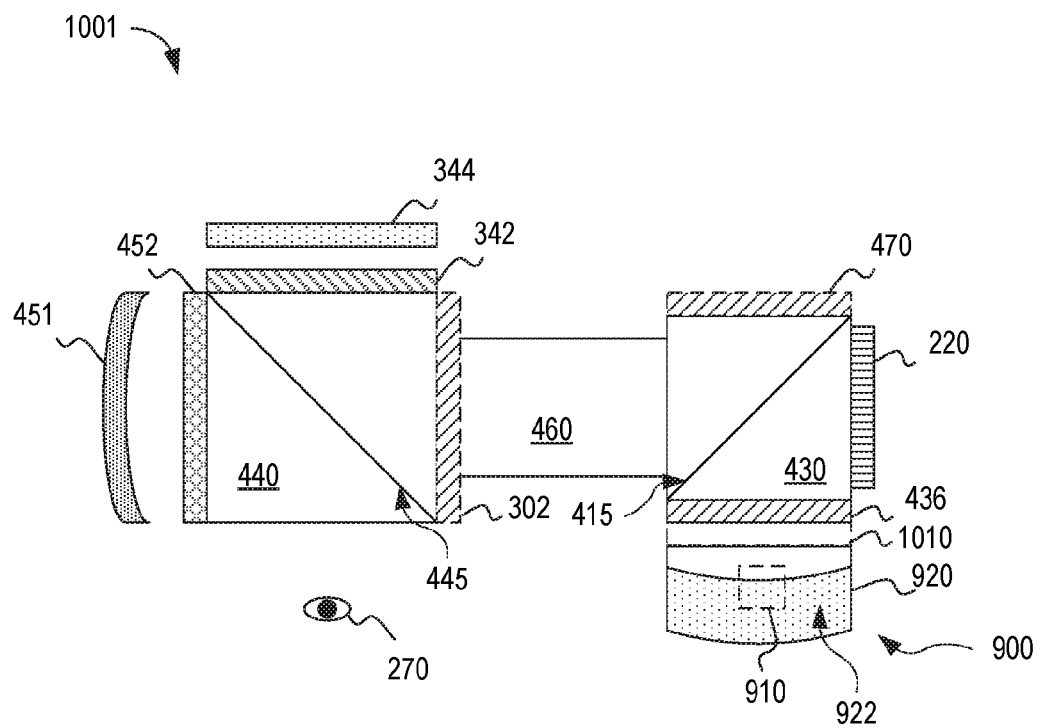
FIGS. 10A and 10B illustrate optical systems for superimposing a display image on an ambient scene, which utilize the illumination module of FIGS. 9A and 9B, according to embodiments.
Figure 10B:
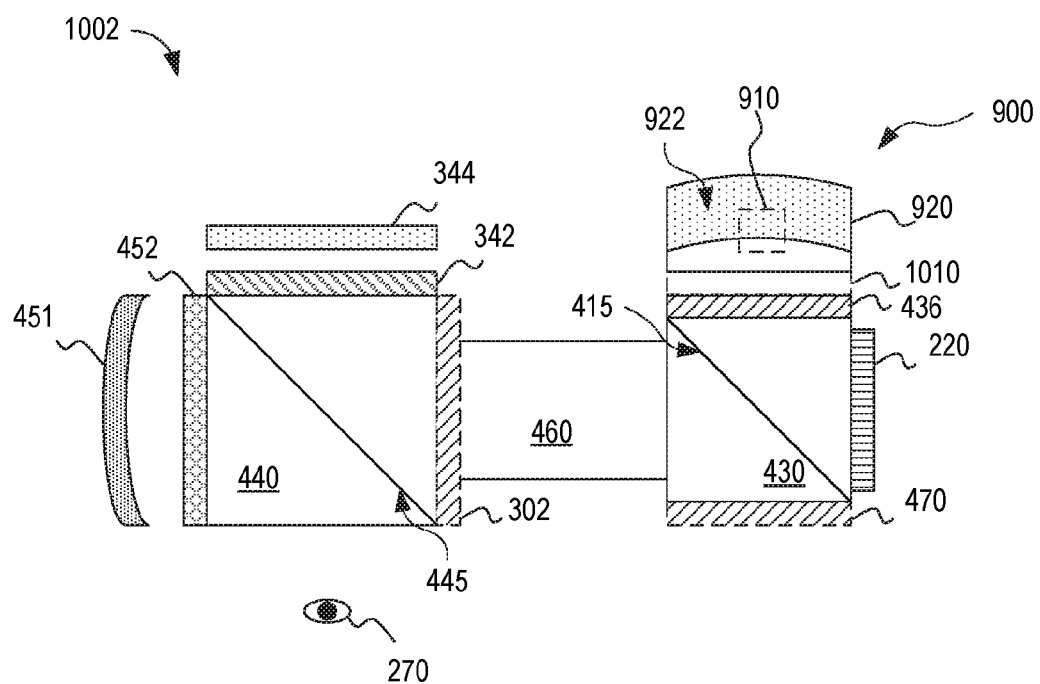

FIGS. 10A and 10B illustrate two similar exemplary optical systems 1001 and 1002, respectively, which are embodiments of optical system 400 (FIG. 4) that incorporate illumination module 900, of FIG. 9. Optical system 1001, illustrated in FIG. 10A, is similar to optical system 400 (FIG. 4), except that light tunnel 434 (FIG. 4) is replaced by solid light collector 920, of FIG. 9, and light source 332 is moved to a position below solid light collector 920. In addition, optical system 1001 may include a diffuser 1010 located between solid light collector 920 and polarization filter 436 (FIG. 4) for diffusing light emitted by solid light collector 920.

Optical system 1002, illustrated in FIG. 10B, is similar to optical system 1001, except that the location of polarization filter 426, optional diffuser 1010, and illumination module 900 is swapped with the location of optional polarization filter 470 (FIG. 4), and that PBS element 430 is re-oriented accordingly. In optical system 1002, PBS element 430 is reoriented such that PBS interface 415 (FIG. 4) is parallel to PBS interface 445 (FIG. 4).

Figure 11A:
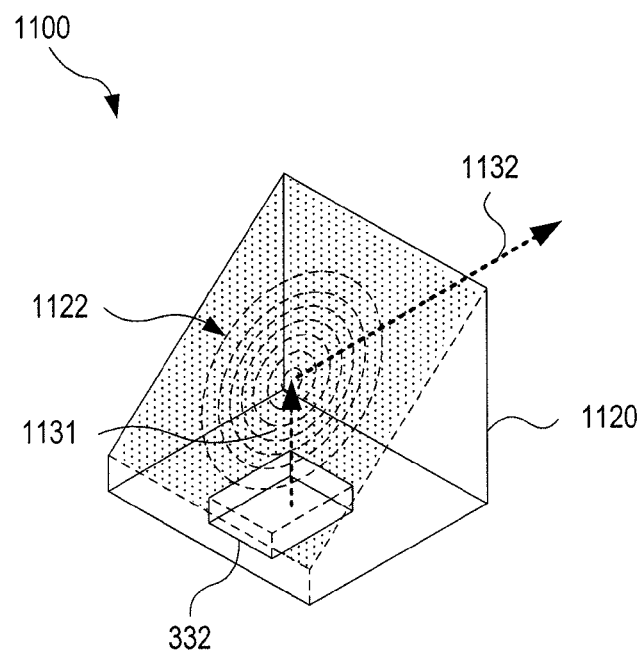
FIGS. 11A and 11B illustrate, in perspective view and cross-sectional side view, respectively, an illumination module, for use in the display device of FIG. 3, which includes a solid light collector with a Fresnel reflector for collecting and directing light from a light source towards the display, according to an embodiment.
Figure 11B:
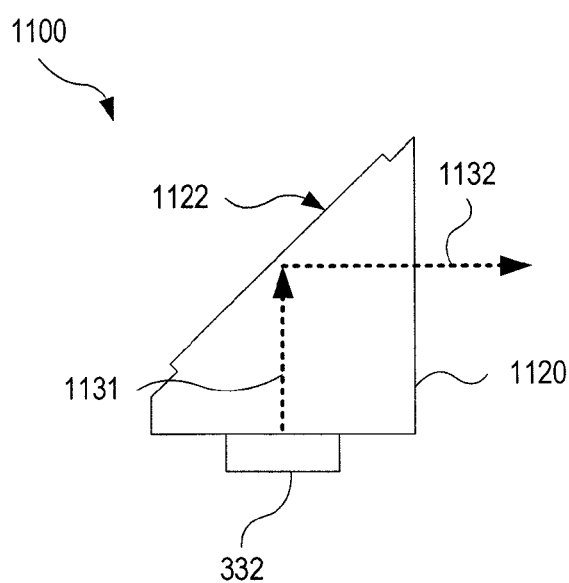

FIG. 11 illustrates one exemplary illumination module 1100, which is an embodiment of illumination module 330 (FIG. 3) including collector 334. Illumination module 1100 includes light source 332 (FIG. 3) and a solid light collector 1120, which is an embodiment of collector 334 (FIG. 3). FIG. 11A shows illumination module 1100 in perspective view from a vantage point below light source 332. FIG. 11B shows illumination module 1100 in cross-sectional side-view, where the cross section is in the plane defined by the general propagation directions of light through illumination module 1100. FIGS. 11A and 11B are best viewed together.

Solid light collector 1120 is similar to solid light collector 920 of FIG. 9, except that curved surface 922 (FIG. 9) is replaced by a Fresnel reflector 1122. Fresnel reflector 1122 collects and focuses a large solid angle of light 1131, emitted by light source 332, to form light 1132. Light 1132 has a general propagation direction, which is substantially orthogonal to that of light 1131. Light 1132 may include light propagation in a range of directions, defined by Fresnel reflector 1122 and the emission properties of light source 332. Solid light collector 1120 may be a solid material capable of transmitting light of a desired wavelength, such as visible light. For example, solid light collector 1120 may be made of glass or an optical plastic, such as acrylic, polystyrene, polycarbonate, or polyolefin. Illumination module 1100 may be incorporated in optical systems 1001 and 1002 of FIGS. 10A and 10B, respectively, in the place of illumination module 900 (FIGS. 9 and 10).

Figure 12:
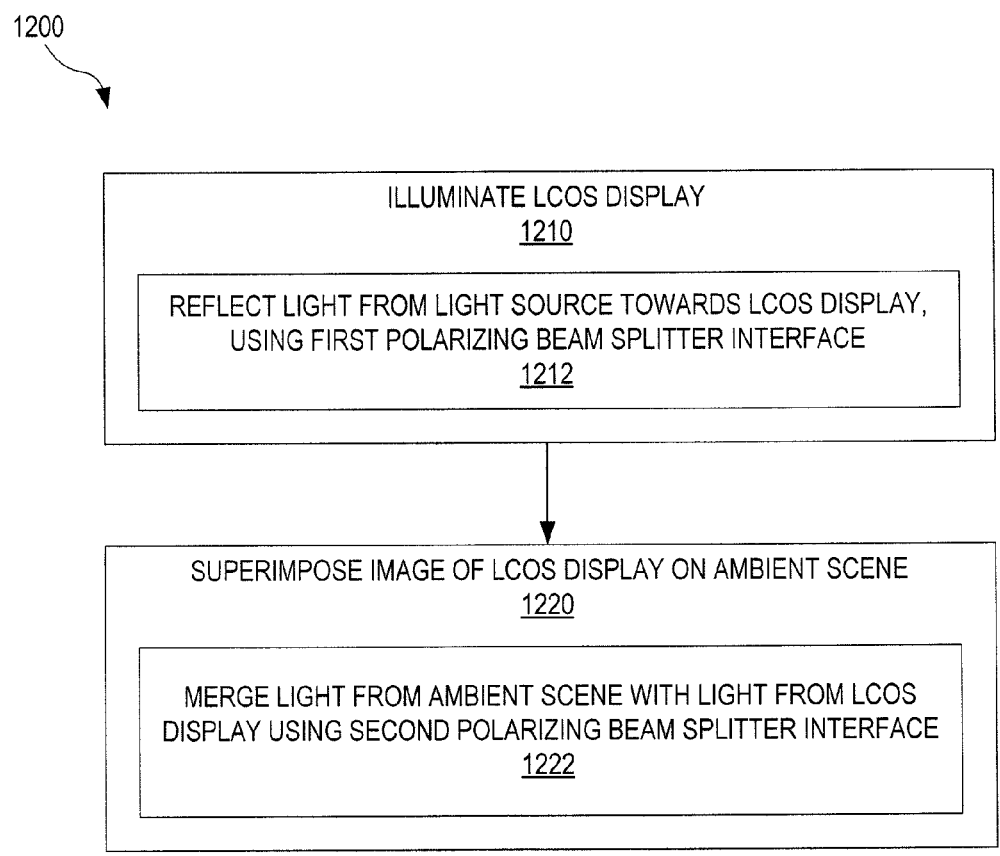
FIG. 12 illustrates a method for superimposing an image of a liquid-crystal-on-silicon display on an ambient scene, according to an embodiment.

FIG. 12 illustrates one exemplary method 1200 for superimposing a display image on an ambient scene viewed by the pupil of a user. Method 1200 may be performed by, for example, display device 200 of FIG. 2.

In a step 1210 an LCOS display is illuminated. For example, illumination module 230 (FIG. 2) illuminates an embodiment of display 220 (FIG. 2) which is an LCOS display. Step 1210 includes a step 1212 of reflecting light from a light source towards the LCOS display using a first PBS interface. For example, PBS interface 215 (FIG. 2) reflects light from illumination module 230 (FIG. 2) towards an embodiment of display 220 (FIG. 2) which is an LCOS display.

In a step 1220, an image of the LCOS display is superimposed on an ambient scene. In one example of operation of step 1220, viewing unit 240 (FIG. 2) superimposes an image of display 220 (FIG. 2), implemented as an LCOS display, on ambient scene 260 (FIG. 2) viewed by pupil 270 (FIG. 2). Step 1220 includes a step 1222, wherein light from the ambient scene is merged with light from the LCOS display using a second PBS interface. In an embodiment, the first and second PBS interfaces are orthogonal to a common plane. For example, PBS interface 245 (FIG. 2) merges light from ambient scene 260 (FIG. 2) with light originating from display 220 (FIG. 2), implemented as an LCOS display, where the light originating from display 220 is received from imaging objective 250 (FIG. 2).

Figure 13:
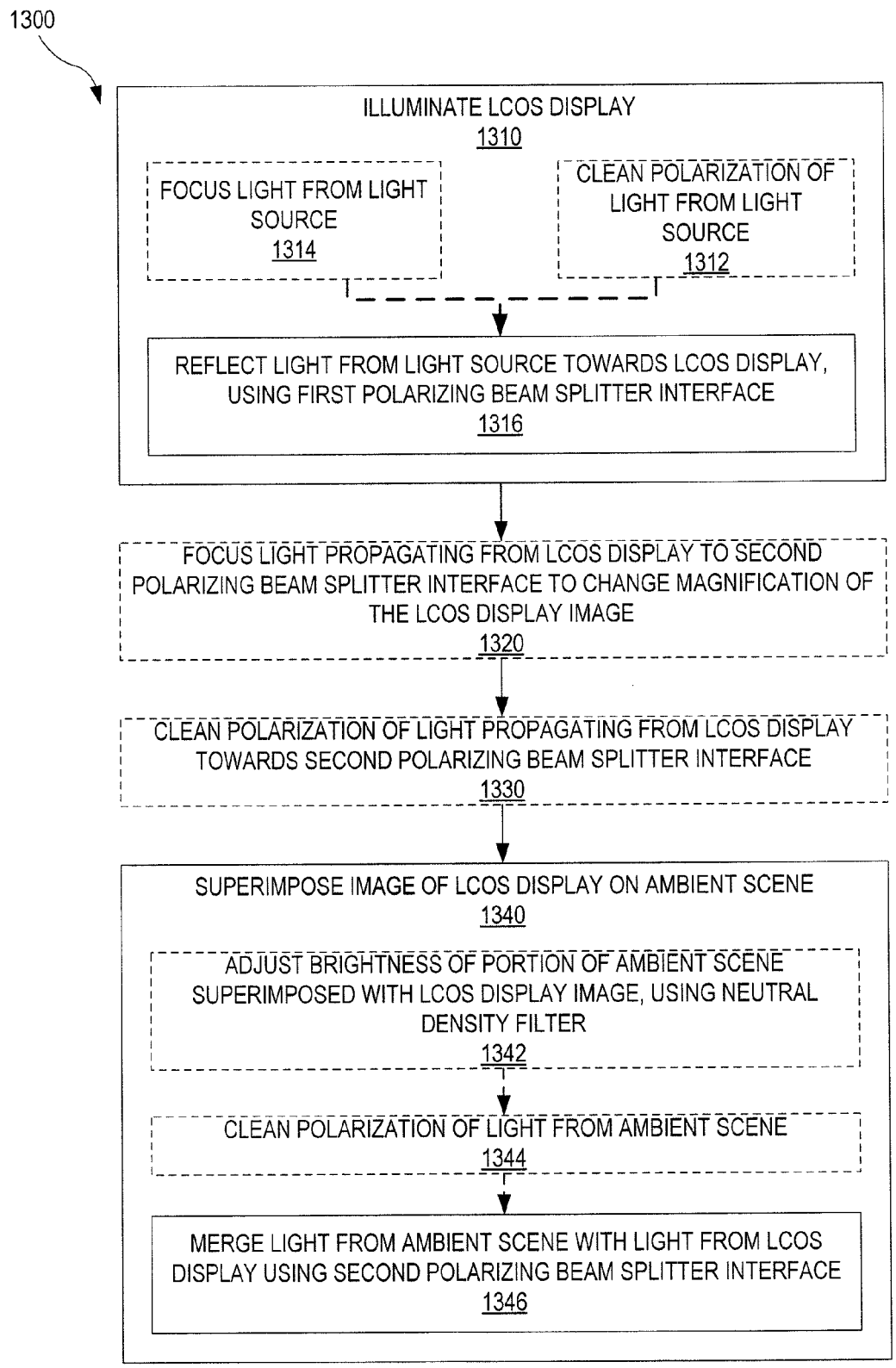
FIG. 13 illustrates an embodiment of the method of FIG. 12, which includes added functionality for providing a higher-quality display image.

FIG. 13 illustrates one exemplary method 1300 for superimposing a display image on an ambient scene viewed by the pupil of a user. Method 1300 may be performed by, for example, display device 300 of FIG. 3, or by one of optical systems 400 (FIG. 4), 500 (FIG. 5), 600 (FIG. 6), 700 (FIG. 7), 1001 (FIG. 10A), and 1002 (FIG. 10B). Method 1300 is an embodiment of method 1200 (FIG. 12), which includes one or more of steps to (a) adjust brightness of the ambient scene in the portion of the field of view of the pupil associated with the display image, (b) clean the polarization state of light to produce a higher-quality display image with less or no stray light interference, (c) focus illumination to provide a bright display image and/or reduce power consumption, and (d) focus light propagating from the LCOS display to provide a display image of different magnification.

Method 1300 includes a step 1310, for illuminating an LCOS display, and a step 1340 for superimposing an image of the LCOS display on the ambient scene viewed by the pupil of the user. Steps 1310 and 1340 are examples of steps 1210 and 1240, respectively, of method 1200 (FIG. 12). Step 1310 includes a step 1316, wherein method 1300 performs step 1212 of method 1200. Step 1340 includes a step 1346, wherein method 1300 performs step 1222 of method 1200.

In an embodiment, step 1310 includes a step 1314 of focusing light from the light source used to illuminate the LCOS display. Step 1314 may provide increased efficiency of illumination of the LCOS display to provide a brighter display image and/or lower power consumption associated with operation of the light source. In an embodiment, illustrated in FIG. 13, step 1314 is performed prior to step 1316. However, step 1314 may be performed after step 1316, without departing from the scope hereof. In an example, illumination focusing module 338 (FIG. 3) focuses light received from light source 332 (FIG. 3) of illumination module 330 (FIG. 3). Alternatively, collector 334 (FIG. 3), for example implemented with solid light collector 920 (FIG. 9) or solid light collector 1120 (FIG. 11), focuses light emitted by light source 332 (FIGS. 3, 9, and 11).

In an embodiment, method 1300 includes a step 1320, wherein light propagating from the LCOS display to the second PBS interface is focused to change the magnification of the LCOS display image superimposed on the ambient scene in step 1340. For example, lens 312 (FIG. 3) or lens 304 (FIG. 3) focus light propagating from display 220 (FIGS. 2 and 3), implemented as an LCOS display, to PBS interface 245 (FIGS. 2 and 3).

Method 1330 may further include one or more of steps 1312, 1330, and 1344 to clean the polarization state of light propagating in the optical system used to form and superimpose the display image on the ambient scene. Steps 1312, 1330, and 1344 may reduce the amount of stray light propagating in the optical system, for example due to imperfect polarization filtering by the PBS interfaces used therein. As a result, steps 1312, 1330, and 1344 may provide a higher quality display image.

Step 1312 is performed as a portion of step 1310. In an embodiment, illustrated in FIG. 13, step 1312 is performed prior to step 1316. In step 1312, the polarization of light propagating from the light source towards the LCOS display is cleaned. For example, polarization filter 336 (FIG. 3) cleans the polarization state of light propagating from light source 332 (FIG. 3) towards display 220 (FIGS. 2 and 3), implemented as an LCOS display.

Step 1330 is performed between steps 1310 and 1340. Although illustrated in FIG. 13 as being performed after optional step 1320, step 1330 may be performed before optional step 1320, without departing from the scope hereof. In step 1330, the polarization state of light, propagating from the LCOS display towards the second PBS interface, is cleaned. For example, polarization filter 302 (FIG. 3) cleans the polarization state of light propagating from display 220 (FIGS. 2 and 3), implemented as an LCOS display, towards PBS interface 245 (FIGS. 2 and 3).

Step 1344 is performed as a portion step 1340, prior to performing step 1346. In step 1344, the polarization state of light from the ambient scene is cleaned. For example, polarization filter 342 (FIG. 3) cleans the polarization state of light propagating from ambient scene 260 (FIGS. 2 and 3) towards PBS interface 245 (FIGS. 2 and 3).

In an embodiment, step 1340 includes a step 1342, performed before step 1346, of using a neutral density filter to adjust the brightness of the ambient scene in the portion of the field of view of the pupil that is associated with the LCOS display image. Hence, step 1342 may provide improved contrast of the display image, as viewed by the pupil. For example, if the ambient scene (e.g. ambient scene 260 of FIG. 2) is very bright, which may be the case if the display device is operated in a brightly lit environment, the ND filter may reduce the brightness of ambient scene in the portion of the field of view of the pupil that is occupied by the display image.

In contrast, in an example of step 1340 that does not include step 1342, it may be necessary to increase the power of the light source illuminating the LCOS display, which increases power consumption by the display device. Accordingly, step 1342 may offer an energy efficient solution to achieving good contrast of the display image relative to the ambient scene, which is particularly advantageous for embodiments of the display device that are battery powered. The neutral density filter may have fixed or adjustable transmission coefficient. In an embodiment, step 1342 includes electronically adjusting the transmission coefficient of the neutral density filter, for example to optimize display image contrast, as perceived by the user, in response to changes in ambient scene brightness. In an example, ND filter 344 (FIG. 3) adjusts the brightness of light from ambient scene 260 (FIGS. 2 and 3) in the portion of the field of view of pupil 270 (FIGS. 2 and 3), occupied by the image of display 220 (FIGS. 2 and 3), implemented as an LCOS display. Although illustrated in FIG. 13 as being performed prior to step 1344, step 1342 may be performed after step 1344, without departing from the scope hereof.

Step 1340 may further include step 1346, which is similar to step 1222 discussed above.

Figure 14A:
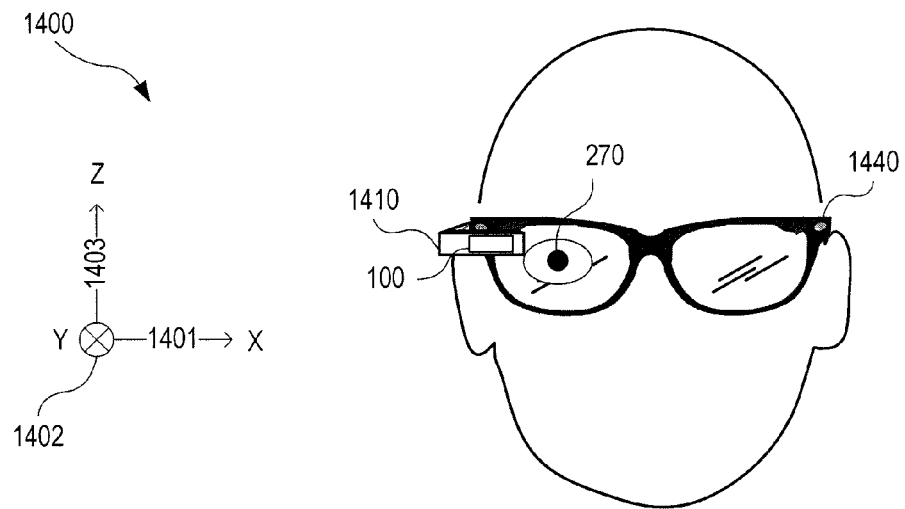
FIGS. 14A, 14B, and 14C illustrate a fixture for coupling the display device of FIG. 1 to a user-mounted holder, which includes a plurality of degrees of freedom for aligning the display device relative to a pupil of the user, according to an embodiment.
Figure 14B:
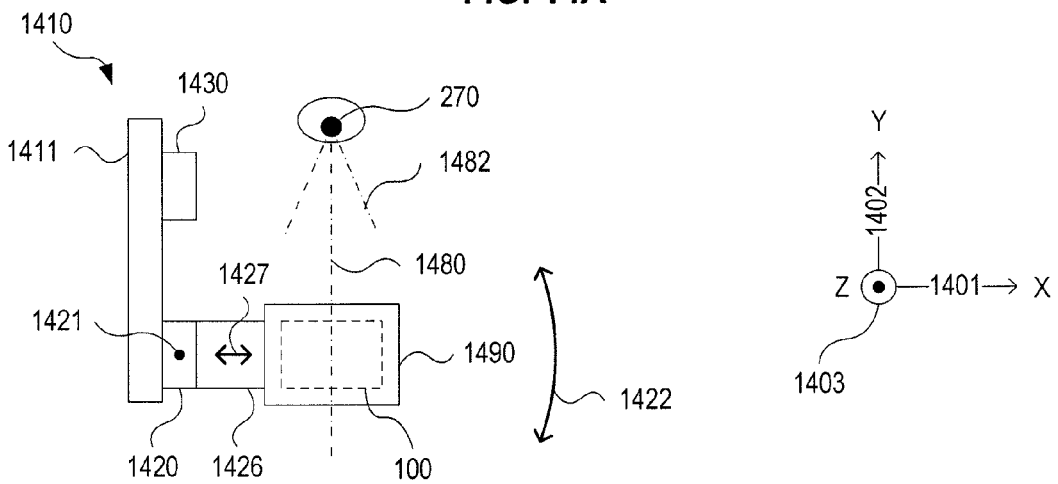
Figure 14C:
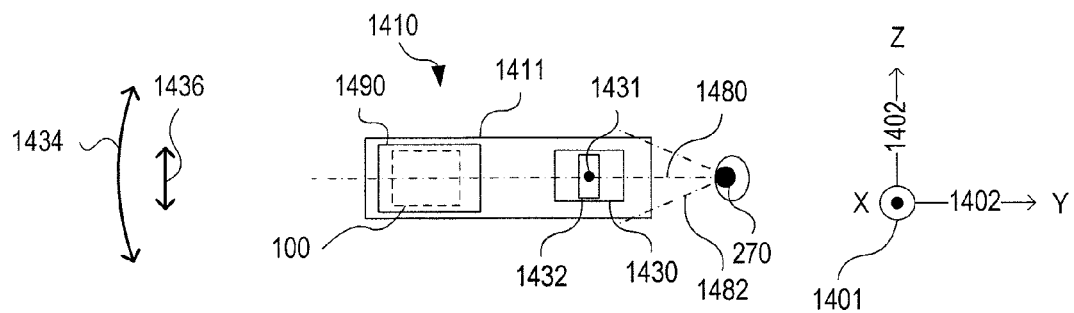

FIGS. 14A, 14B, and 14C illustrate one exemplary fixture 1410 for coupling near-eye display device 100 (FIG. 1) to a holder 1440 mounted on the user of near-eye display device 100. Fixture 1410 may be used to couple other near-eye display devices to a holder 1440 without departing from the scope hereof. Fixture 1410 includes a plurality of degrees of freedom for aligning a display image formed by display device 100 and superimposed, by display device 100, on an ambient scene viewed by a pupil of the user. FIGS. 14A, 14B, and 14C are best viewed together. The plurality of degrees of freedom of fixture 1410 facilitate alignment of display device 100 with respect to a field of view 1482 of a pupil 270 (FIG. 2) of a user. For example, fixture 1410 may be manipulated to position display device 100 in a desired portion of field of view 1482 of pupil 270. Additionally, fixture 1410 may be manipulated to adjust the angle of display device 100 relative to a viewing axis 1480 from pupil 270 to display device 100. This functionality reduces or eliminates keystone distortion. Fixture 1410 provides alignment of the display image provided by display device 100 without changing relative alignment of internal optical components. The optical system of display device 100 is moved as a rigid piece.

FIG. 14A is a diagram 1400 showing fixture 1410 implemented in an exemplary use setting, wherein fixture 1410 couples display device 100 to holder 1440 worn by the user of display device 100. Pupil 270 (FIG. 2), of the user, receives a display image generated by display device 100 and superimposed, by display device 100, on an ambient scene.

FIG. 14B shows a cross-sectional view of fixture 1410 and display device 100 mounted in or on fixture 1410, where the cross-section is taken in the x-y plane. Reference is made to a coordinate system indicated by x-axis 1401, y-axis 1402, and z-axis 1403. Under normal use of display device 100, the face of the user will be oriented to be approximately in the x-z plane, as shown in FIG. 14A, although fixture 1410 allows for deviations therefrom. Fixture 1410 includes a device holder 1490 for holding or at least partially enclosing display device 100. In an embodiment, display device 100 is display device 200 (FIG. 2) and device holder 1490 is enclosure 290 (FIG. 2). Fixture 1410 further includes a bracket 1411, a pivot joint 1420, a section 1426 of adjustable length, and a mount 1430. Bracket 1411 is connected to mount 1430 and, directly or indirectly, to pivot joint 1420. Pivot joint 1420 is, directly or indirectly, connected to section 1426, which is, directly or indirectly, connected to device holder 1490. Mount 1430 is configured for attaching to holder 1440, either directly or indirectly. The coordinate system defined by x-axis 1401, y-axis 1402, and z-axis 1403 is fixed with respect to mount 1430.

Pivot joint 1420 provides a rotational degree of freedom in the x-y plane about a rotational axis 1421, as indicated by arrow 1422. Hence, pivot joint 1420 adjusts to change the angle, in the x-y plane, of display device 100 with respect to viewing axis 1480. Accordingly, pivot join 1420 facilitates adjustment of the angle, in the x-y plane, of the display image, provided by display device 100, with respect to viewing axis 1480. The length of section 1426 is adjustable in a direction 1427, such that display device 100 may be translated relative to field of view 1482. Thus, section 1426 provides a translational degree of freedom. In an embodiment, section 1426 is a telescoping section. The placements of pivot joint 1420 and section 1426 may be interchanged, without departing from the scope hereof, such that section 1426 is closer than pivot joint 1420 to bracket 1411. In an example, the length of section 1426 has an adjustable range of between 2 millimeters and 10 millimeters, such as a range of 7 millimeters. In an example, pivot joint 1420 has an angular adjustment range of between 2 degrees and 15 degrees, such as a range of 7 degrees. Generally, the translational degree of freedom provided by section 1426 is in a direction non-parallel to viewing axis 1480. Under normal use conditions, the translational degree of freedom provided by section 1426 may be in a direction that is substantially orthogonal to viewing axis 1480, although the setting of pivot joint 1420, as well as the orientation of mount 1430 relative to viewing axis 1480, may cause deviations therefrom.

FIG. 14C shows a cross-sectional view of fixture 1410 and display device 100 mounted in or on fixture 1410, where the cross-section is taken in the y-z plane. The interface between mount 1430 includes a rotational degree of freedom and a translational degree of freedom. In an embodiment, the rotational degree of freedom is implemented as a pivot joint. Bracket 1411 rotates in the y-z plane about a pivot axis 1431, as indicated by arrow 1434. This facilitates adjustment of the angle, in the y-z plane, of display device 100 and the associated display image with respect to viewing axis 1480. In addition, bracket 1411 may translate relative to mount 1430 in a direction 1436, and thus translate display device 100 and the associated display image relative to field of view 1482. This translational degree of freedom may be implemented as a sliding interface between bracket 1411 and mount 1430 in a slot 1432. In an example, the interface between bracket 1411 and mount 1430 provides a translational adjustment range of between 2 millimeters and 10 millimeters, such as a range of 7 millimeters, and an angular adjustment range of between 2 degrees and 15 degrees, such as a range of 7 degrees. Generally, the translational degree of freedom provided by mount 1430 is in a direction non-parallel to viewing axis 1480. Under normal use conditions, translational degree of freedom provided by mount 1430 may be in a direction that is substantially orthogonal to viewing axis 1480, although the setting of the rotational degree of freedom of mount 1430, as well as the orientation of mount 1430 relative to viewing axis 1480, may cause deviations therefrom. In an embodiment, pivot axis 1431 is substantially orthogonal to pivot axis 1421, such that the respective rotation directions associated therewith are substantially orthogonal.

Embodiments of fixture 1410, not illustrated in FIGS. 14A, 14B, and 14C, may include only a portion of the two translational and two rotational degrees of freedom illustrated in FIGS. 14A, 14B, and 14C, without departing from the scope hereof. For example, an embodiment of fixture 1410 may include only the degrees of freedom provided by pivot joint 1420 and section 1426, while the interface between bracket 1411 and mount 1430 is fixed. Furthermore, certain portions of display device 100 may be located in fixture 1410, without departing from the scope hereof. For example, with display device 200 (FIG. 2) being implemented as display device 100, controller 280 and interface 285 may be located in fixture 1430 or another location external to holder 1490, while optical system 201 is located in or on holder 1490.

Figure 15:
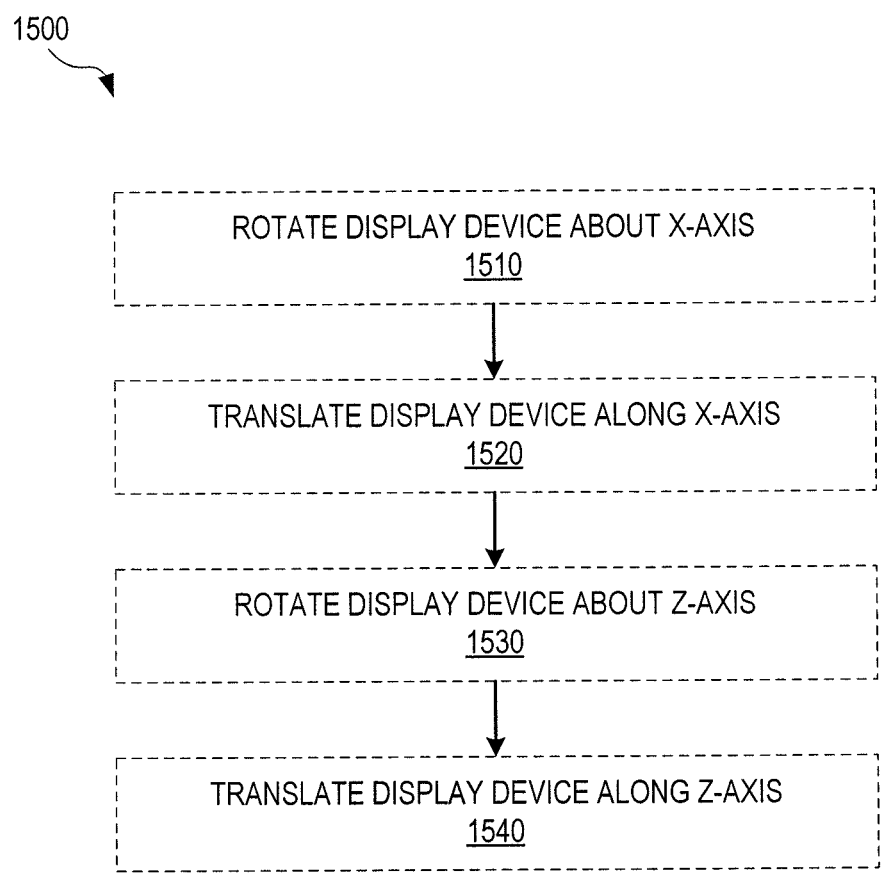
FIG. 15 illustrates a method for manipulating a fixture that couples the display device of FIG. 1 to a user-mounted holder, to align the display device relative to a pupil of the user, according to an embodiment.

FIG. 15 illustrates one exemplary method 1500 for aligning a display image, generated by a near-eye display device, superimposed on an ambient scene viewed by a pupil of a user. Method 1500 provides alignment of the display image provided by the display device without changing relative alignment of internal optical components. The optical system of the display device is moved as a rigid piece. Method 1500 may be performed by fixture 1410 of FIGS. 14A, 14B, and 14C. Method 1500 manipulates one or more degrees of freedom of a fixture, directly or indirectly coupling the display device to a user-mounted holder, to align the display device and the associated display image with respect to field of view of the pupil. For example, one or more degrees of freedom of fixture 1410 (FIGS. 14A, 14B, and 14C) are manipulated to align the display image provided by display device 100 (FIGS. 1, 14A, 14B, and 14C) with respect to pupil 270 (FIGS. 2, 14A, 14B, and 14C). Method 1500 includes one or more of steps 1510, 1520, 1530, and 1540, which may be performed in an arbitrary order, as well as iteratively. While steps 1510, 1520, 1530, and 1540 refer to translation along or rotation about an axis of a cartesian coordinate system, actual settings of different degrees of freedom may cause one or more of steps 1510, 1520, 1530, and 1540 to result in translation along or rotation about a direction that deviates from an axis of the cartesian coordinate system, without departing from the scope hereof.

In step 1510, the display device is rotated about the x-axis. Reference is made to the coordinate system shown in FIG. 14A, assuming normal operating conditions approximately as illustrated in FIG. 14A. Step 1510 adjusts the angle, in the y-z plane, of the display device and associated display image with respect to a viewing axis from the pupil to the display device. Therefore, step 1510 may adjust vertical keystone effect of the display image as perceived by the user.

Figure 16:
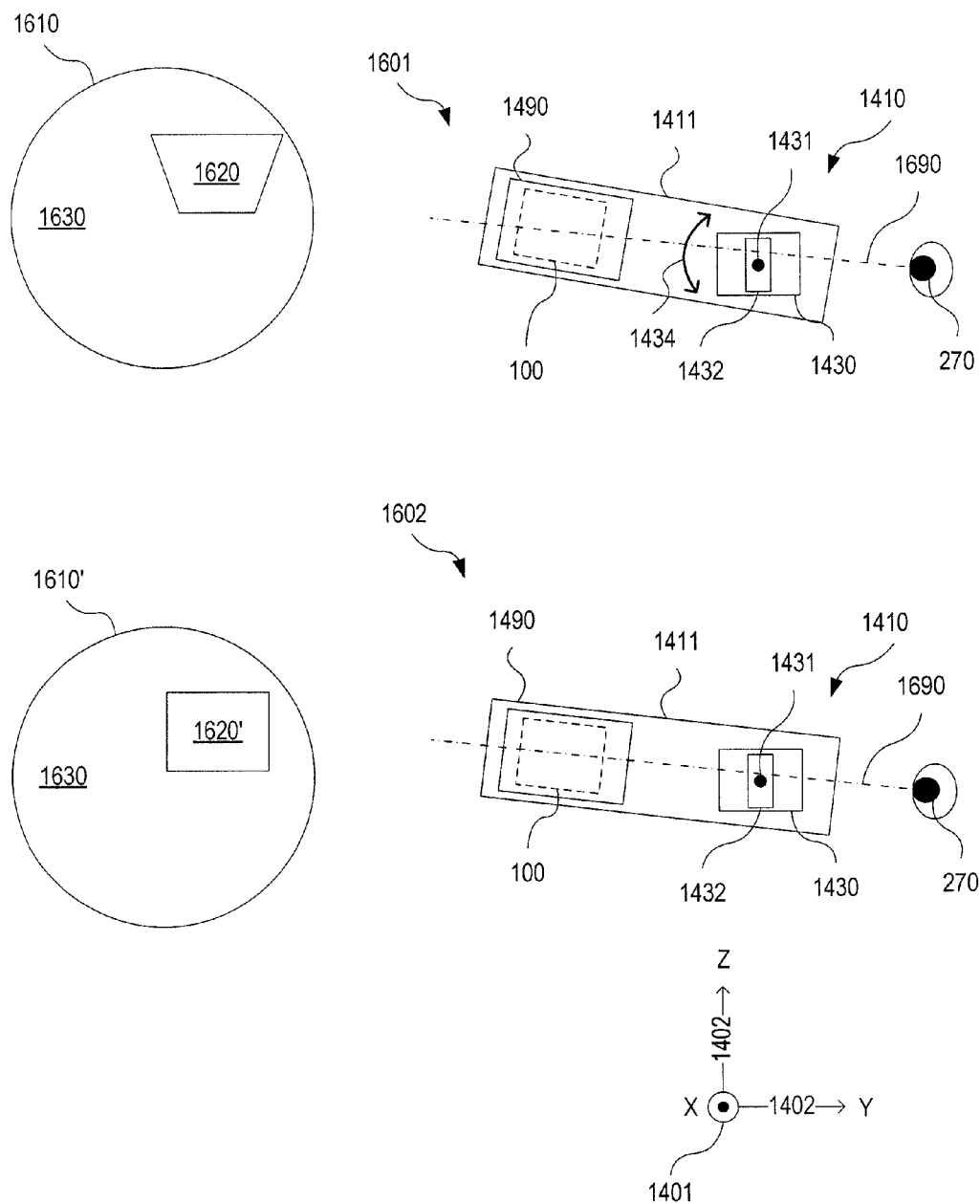
FIG. 16 illustrates manipulation of a rotational degree of freedom of the fixture of FIGS. 14A, 14B, and 14C to adjust keystone effect, in one dimension, of the display image provided to a pupil of a user by the display device of FIG. 1, according to an embodiment.

FIG. 16 illustrates one exemplary application of step 1510. A diagram 1601 illustrates an initial configuration of fixture 1410 (FIGS. 14A, 14B, and 14C), holding display device 100 (FIGS. 1, 14A, 14B, and 14C), with respect to a viewing axis 1690 from pupil 270 (FIGS. 2, 14A, 14B, and 14C) to display device 100. At the configuration shown in diagram 1601, pupil 270 observes a scene 1610. Scene 1610 includes a display image 1620, provided by display device 100, superimposed on an ambient scene 1630. Since the display image provided by display device 100 is non-orthogonal to viewing axis 1690, display image 1620 exhibits vertical keystone distortion. Pivoting bracket 1411 (FIG. 14C) about pivot axis 1431 (FIG. 14C), as indicated by arrow 1434 (FIG. 14C), aligns display device 100, such that the projection of the display image, provided by display device 100, onto the y-z plane, is orthogonal to viewing axis 1690. This is illustrated in diagram 1602 and results in pupil 270 observing a scene 1610', wherein the display image 1620' has no vertical keystone distortion.

Returning to method 1500 of FIG. 15, in step 1520, the display device is translated along the x-axis. Step 1520 translates the display device and associated display image relative to a field of view of the pupil. Therefore, step 1520 may adjust positioning of the display image, in the x-direction, in the field of view of the user. For example, step 1520 may be utilized to place the complete display image within the field of view and/or place the display image in a position that does not interfere with important portions of the ambient scene.

Figure 17:
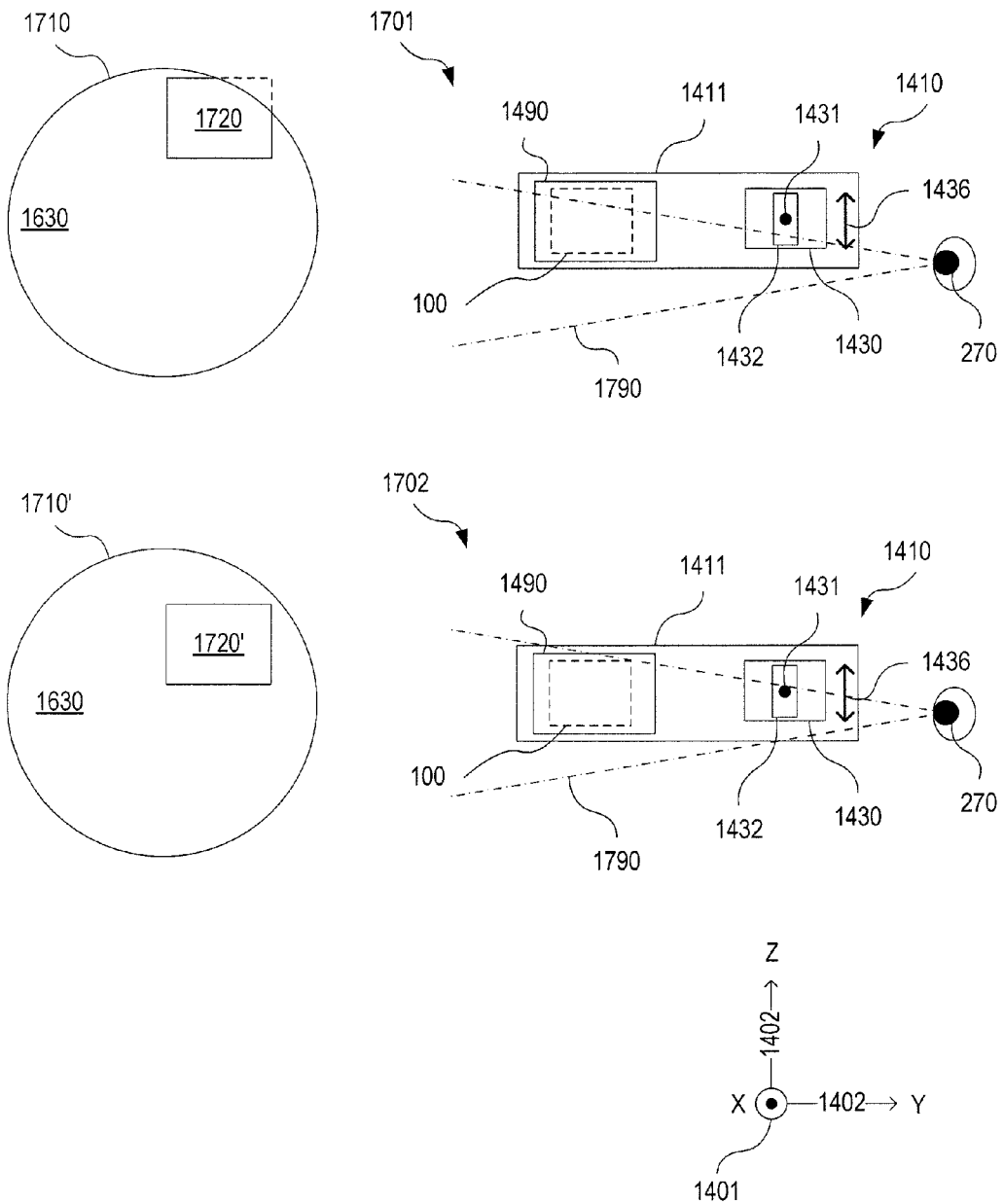
FIG. 17 illustrates manipulation of a translational degree of freedom of the fixture of FIGS. 14A, 14B, and 14C to adjust the positioning, along one dimension with respect to the field of view of a pupil of a user, of the display image provided by the display device of FIG. 1, according to an embodiment.

FIG. 17 illustrates one exemplary application of step 1520. A diagram 1701 illustrates an initial configuration of fixture 1410 (FIGS. 14A, 14B, and 14C), holding display device 100 (FIGS. 1, 14A, 14B, and 14C), with respect to a vertical field of view 1790 of 270 (FIGS. 2, 14A, 14B, and 14C). In the configuration shown in diagram 1701, pupil 270 observes a scene 1710. Scene 1710 includes a display image 1720, provided by display device 100, superimposed on ambient scene 1630 (FIG. 16). Only a sub-portion of the display image provided by display device 100 is within a vertical field of view 1790. Therefore, display image 1720 is clipped. Translating bracket 1411 (FIG. 14C) along direction 1436 (FIG. 14C) may translate display device 100, such that the full display image provided by display device 100 is within vertical field of view 1790. This is illustrated in diagram 1702 and results in pupil 270 observing a scene 1710' that includes the full display image 1720'.

FIG. 17 illustrates configurations of fixture 1410 (FIGS. 14A, 14B, and 14C), where only the translational degree of freedom of the interface between bracket 1411 and mount 1430 is adjusted, and other degrees of freedom of fixture 1410 are set such that this results in translation of display device 100 in the z-direction. In an alternate example of step 1520 (FIG. 15), the rotational degree of freedom of the interface between bracket 1411 and mount 1430 is in a setting, such that adjustment of the translational degree of freedom of the interface between bracket 1411 and mount 1430 results in translation of display device in a direction that deviates from the z-direction. Generally, step 1520 translates the display device in a direction non-parallel to viewing axis from the pupil to the image of the display.

Returning to method 1500 of FIG. 15, in step 1530, the display device is rotated about the z-axis. Step 1530 adjusts the angle, in the x-y plane, of the display device and associated display image with respect to a viewing axis from the pupil to the display device. Therefore, step 1510 may adjust horizontal keystone distortion of the display image as perceived by the user.

Figure 18:
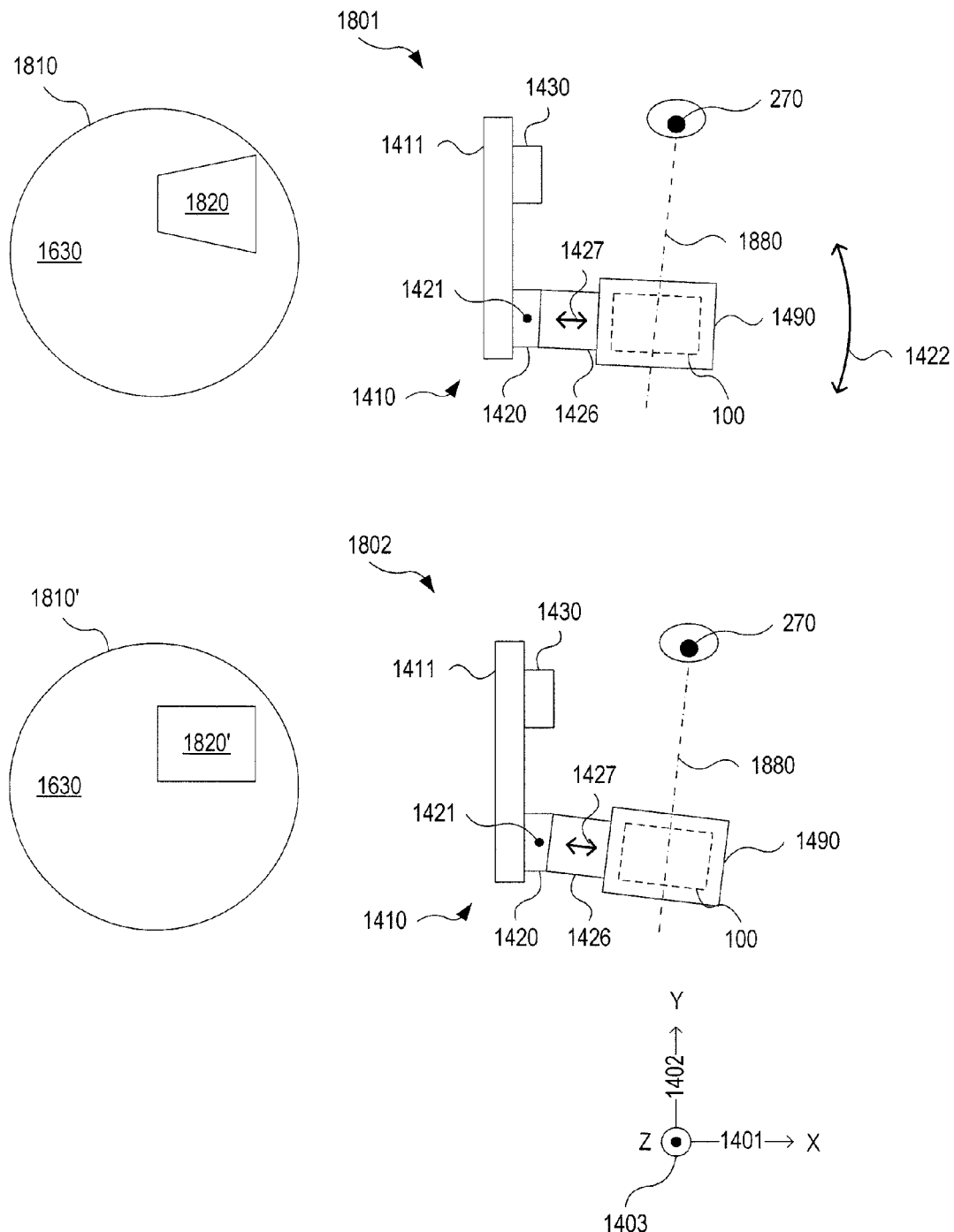
FIG. 18 illustrates manipulation of another rotational degree of freedom of the fixture of FIGS. 14A, 14B, and 14C to adjust keystone effect, in another dimension, of the display image provided to a pupil of a user by the display device of FIG. 1, according to an embodiment.

FIG. 18 illustrates one exemplary application of step 1530. A diagram 1801 illustrates an initial configuration of fixture 1410 (FIGS. 14A, 14B, and 14C), holding display device 100 (FIGS. 1, 14A, 14B, and 14C), with respect to a viewing axis 1890 from pupil 270 (FIGS. 2, 14A, 14B, and 14C) to display device 100. In the configuration shown in diagram 1801, pupil 270 observes a scene 1810. Scene 1810 includes a display image 1820, provided by display device 100, superimposed on ambient scene 1630 (FIG. 16). Since the display image provided by display device 100 is non-orthogonal to viewing axis 1890, display image 1820 exhibits horizontal keystone distortion. Adjusting pivot joint 1420 (FIG. 14B) about pivot axis 1421 (FIG. 14B), as indicated by arrow 1422 (FIG. 14B), aligns display device 100, such that the projection of the display image, provided by display device 100, onto the x-y plane, is orthogonal to viewing axis 1890. This is illustrated in diagram 1802 and results in pupil 270 observing a scene 1810', wherein the display image 1820' has no horizontal keystone distortion. In an embodiment, the rotation direction of step 1530 is substantially orthogonal to the rotation direction of step 1510.

Returning to method 1500 of FIG. 15, in step 1540, the display device is translated along the z-axis. Step 1540 translates the display device and associated display image relative to a field of view of the pupil. Therefore, step 1540 may adjust positioning of the display image, in the z-direction, in the field of view of the user. For example, step 1540 may be utilized to place the complete display image within the field of view and/or place the display image in a position that does not interfere with important portions of the ambient scene.

Figure 19:
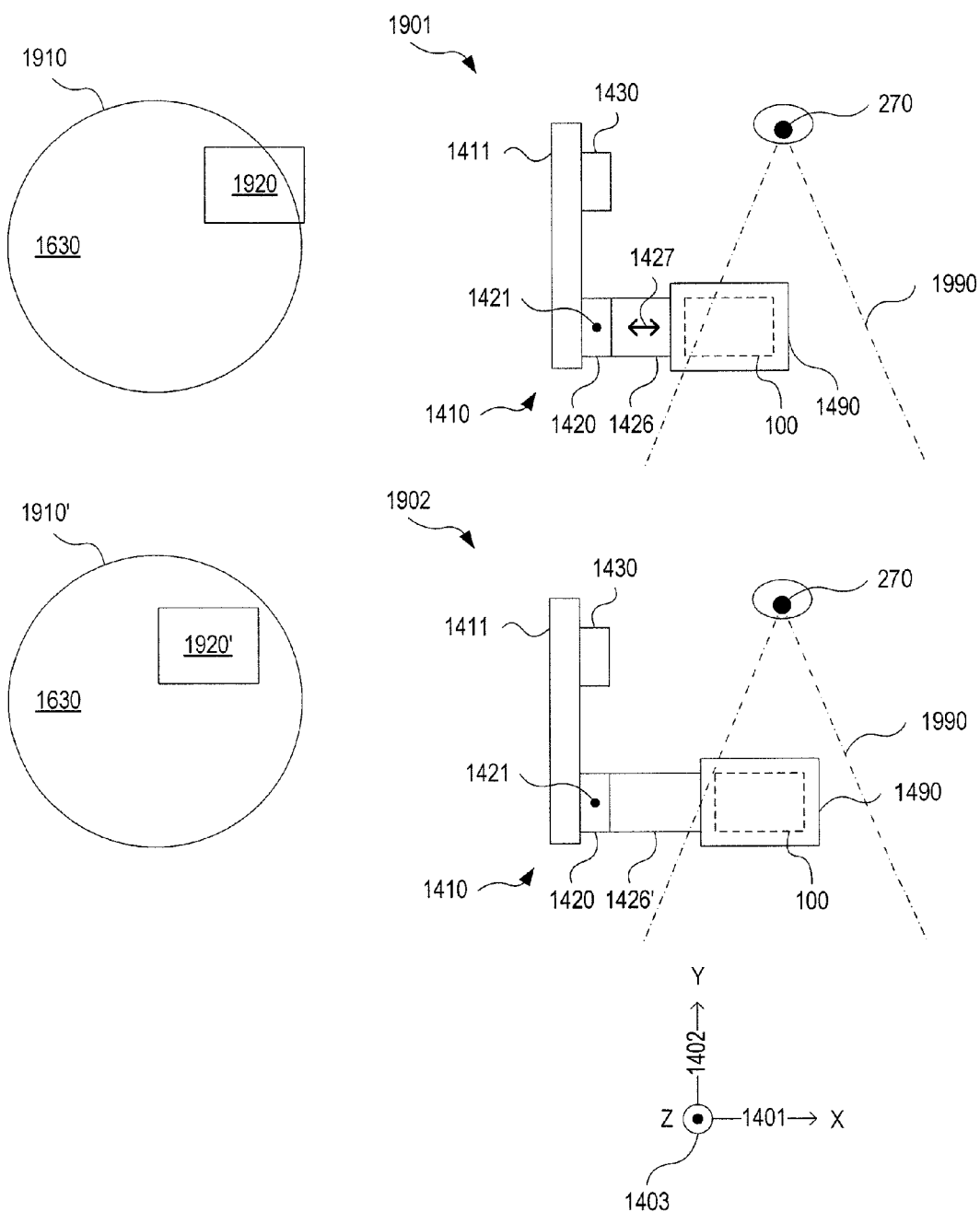
FIG. 19 illustrates manipulation of another translational degree of freedom of the fixture of FIGS. 14A, 14B, and 14C to adjust the positioning, along another dimension with respect to the field of view of a pupil of a user, of the display image provided by the display device of FIG. 1, according to an embodiment.

FIG. 19 illustrates one exemplary application of step 1540. A diagram 1901 illustrates an initial configuration of fixture 1410 (FIGS. 14A, 14B, and 14C), holding display device 100 (FIGS. 1, 14A, 14B, and 14C), with respect to a horizontal field of view 1990 of 270 (FIGS. 2, 14A, 14B, and 14C). At the configuration shown in diagram 1901, pupil 270 observes a scene 1910. Scene 1910 includes a display image 1920, provided by display device 100, superimposed on ambient scene 1630 (FIG. 16). Only a sub-portion of the display image provided by display device 100 is within a horizontal field of view 1990. Therefore, display image 1920 is clipped. Adjusting the length of section 1426 (FIG. 14B) in direction 1427 (FIG. 14B), translates display device 100 in the x-direction, such that the full display image provided by display device 100 is within horizontal field of view 1990. This is illustrated in diagram 1902 and results in pupil 270 observing a scene 1910' that includes the full display image 1920'.

FIG. 19 illustrates configurations of fixture 1410 (FIGS. 14A, 14B, and 14C), where only the length of section 1426 is adjusted, and all other degrees of freedom of fixture 1410 are set such that adjusting the length of section 1426 results in translation of display device 100 in the x-direction. In an alternate example of step 1540 (FIG. 15), pivot joint 1420 is in a setting, such that adjustment of the length of section 1426 results in translation of display device in a direction that deviates from the x-direction. Generally, step 1540 translates the display device in a direction non-parallel to viewing axis from the pupil to the image of the display. In an embodiment, the translation directions of steps 1520 and 1540 are substantially orthogonal.

Figure 20:
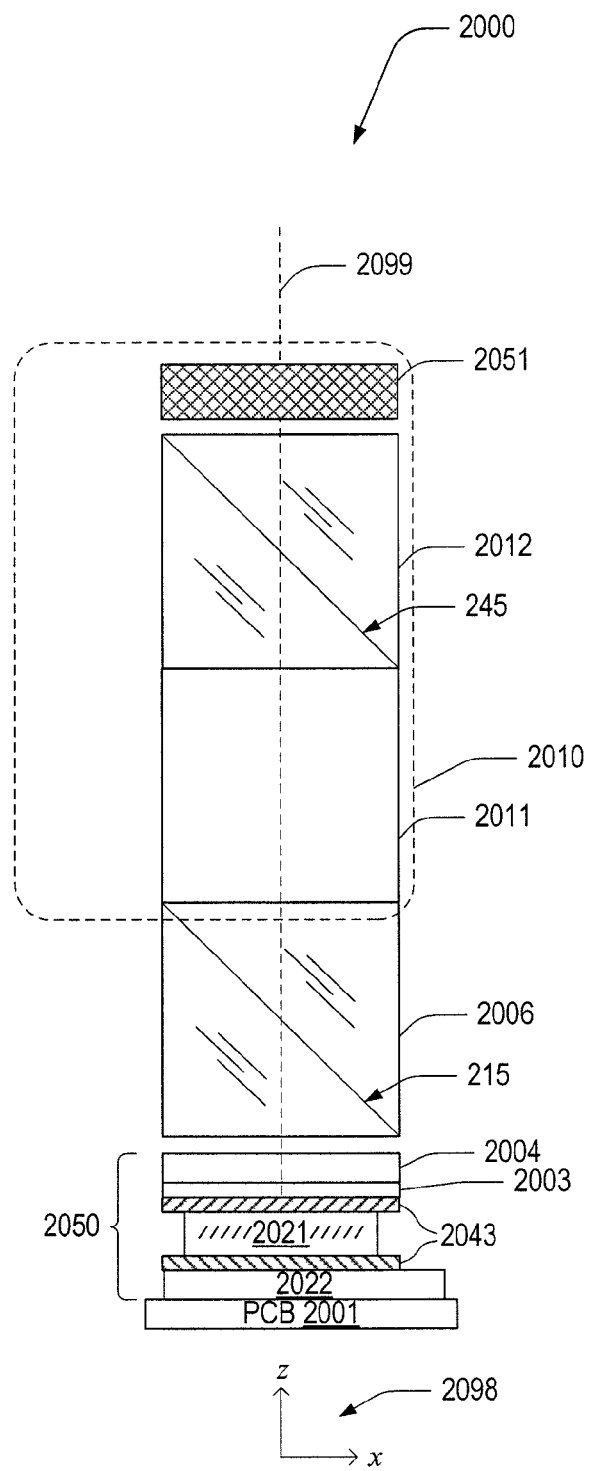
FIG. 20 illustrates a liquid-crystal-on-silicon assembly, which may be implemented in the optical systems of FIGS. 2-7, according to an embodiment.

FIG. 20 illustrates one exemplary LCOS assembly 2000, which is an embodiment of a portion of each of optical systems 400 (FIG. 4) and 500 (FIG. 5). LCOS assembly 2000 is also an embodiment of a portion of each of optical systems 201 (FIG. 2), 301 (FIG. 3), and 600 (FIG. 6). LCOS assembly 2000 includes a wafer-level LCOS die 2050, a printed circuit board (PCB) 2001, a PBS element 2006 that includes PBS interface 215 (FIG. 2), and an optional optical sub-system 2010. Optical sub-system 2010 may include a light tunnel 2010, a PBS element 2012 that includes PBS interface 245 (FIG. 2), and an imaging objective 2051. Light tunnel 2010 is an embodiment of light tunnel 460 (FIG. 4). PBS element 2012 is an embodiment of PBS element 430 (FIG. 4) and PBS element 530 (FIG. 5). Imaging objective 2051 is an embodiment of imaging objective 250 (FIG. 2), and may include multiple elements. Wafer-level LCOS die 2050 includes an active-matrix substrate 2022, alignment layers 2043, liquid crystal 2021, a transparent conducting film 2003, and a cover glass 2004, wherein transparent conducting film 2003 is at least partially transmissive to light. Active-matrix substrate 2022 is mounted on PCB 2001.

Wafer-level LCOS die 2050 forms an LCOS display, such as an LCOS embodiment of display 220 (FIG. 2). PBS element 2006 is configured to reflect illumination light from a light source, not shown in FIG. 20, onto LCOS die 2050 to illuminate the LCOS display. Light emitted by the LCOS display is at least partially transmitted by PBS element 2006 to optional optical sub-system 2010.

In assembly LCOS 2000, all components are centered about an optical axis 2099 within alignment tolerances of the assembly methods used to fabricate assembly 2000. With respect to coordinate system 2098, transverse and longitudinal misalignment refers to misalignment along the x-axis and z-axis respectively.

Figure 21:
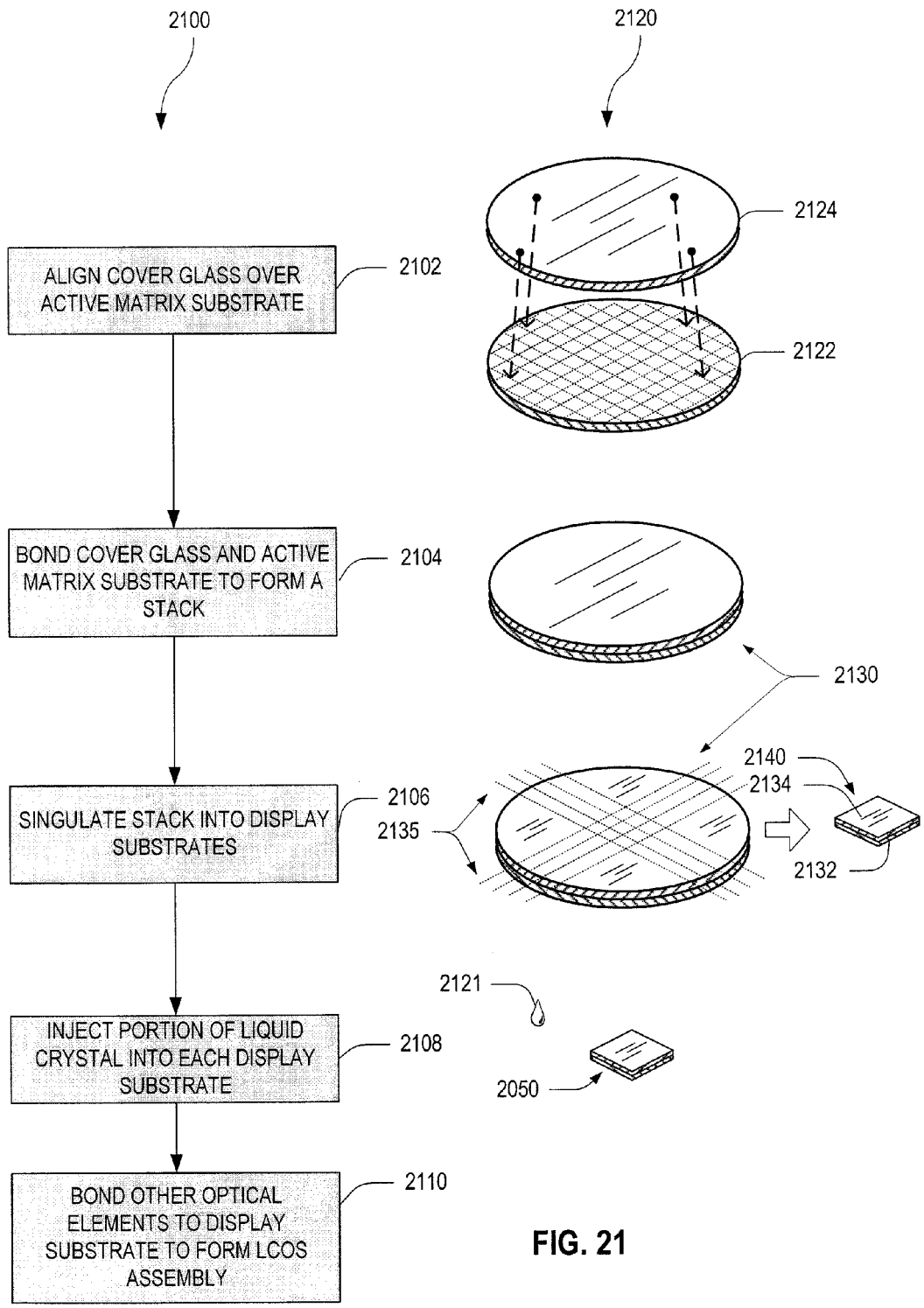
FIG. 21 illustrates a method for manufacturing the liquid-crystal-on-silicon assembly of FIG. 20, wherein the display portion is formed using wafer-level manufacturing methods, according to an embodiment.

FIG. 21 illustrates one exemplary method 2100 of fabricating LCOS assembly 2000 of FIG. 20. FIG. 3 A visual diagram 2120 illustrates steps of method 2100. Method 2100 may be used to fabricate at least a portion of each of optical systems 201 (FIG. 2), 301 (FIG. 3), 400 (FIG. 4), 500 (FIG. 5), 600 (FIG. 6), and 700 (FIG. 7). Method 2100 fabricates LCOS die 2050 (FIG. 20), apart from injection of liquid crystal 2011 (FIG. 20), at the wafer-level and bonds the remaining elements of LCOS assembly 2000 (FIG. 20) to LCOS die 2050 using non-wafer-level methods.

In a step 2102, method 2100 aligns a cover glass 2124 over an active-matrix wafer 2122.

In a step 2104, method 2100 bonds cover glass 2124 and active-matrix wafer 2122 to form a stack 2130.

In a step 2106, method 2100 singulates stack 2130 along dicing lines 2135, which results in display substrates such as display substrate 2140. Display substrate 2140 includes a glass layer 2134 and an active-matrix layer 2132.

In a step 2108, method 2100 injects a liquid crystal portion 2121 between glass layer 2134 and active-matrix layer 2132 of display substrate 2140 to form wafer-level LCOS die 2050 of LCOS assembly 2000 (FIG. 20).

Method 2100 may include steps for adding additional alignment layers on active-matrix wafer 2122 and cover glass 2124, before step 2106, without departing from the scope hereof.

In a step 2110, method 2100 forms LCOS assembly 2000 of FIG. 20 by bonding PCB 2001, PBS element 2006 (FIG. 20), and, optionally, optical sub-system 2010 (FIG. 20) to LCOS die 2050. Step 2110 may be performed prior to step 2108, without departing from the scope hereof. In LCOS assembly 2000, only display substrate 2140 is fabricated on the wafer level.

Figure 22:
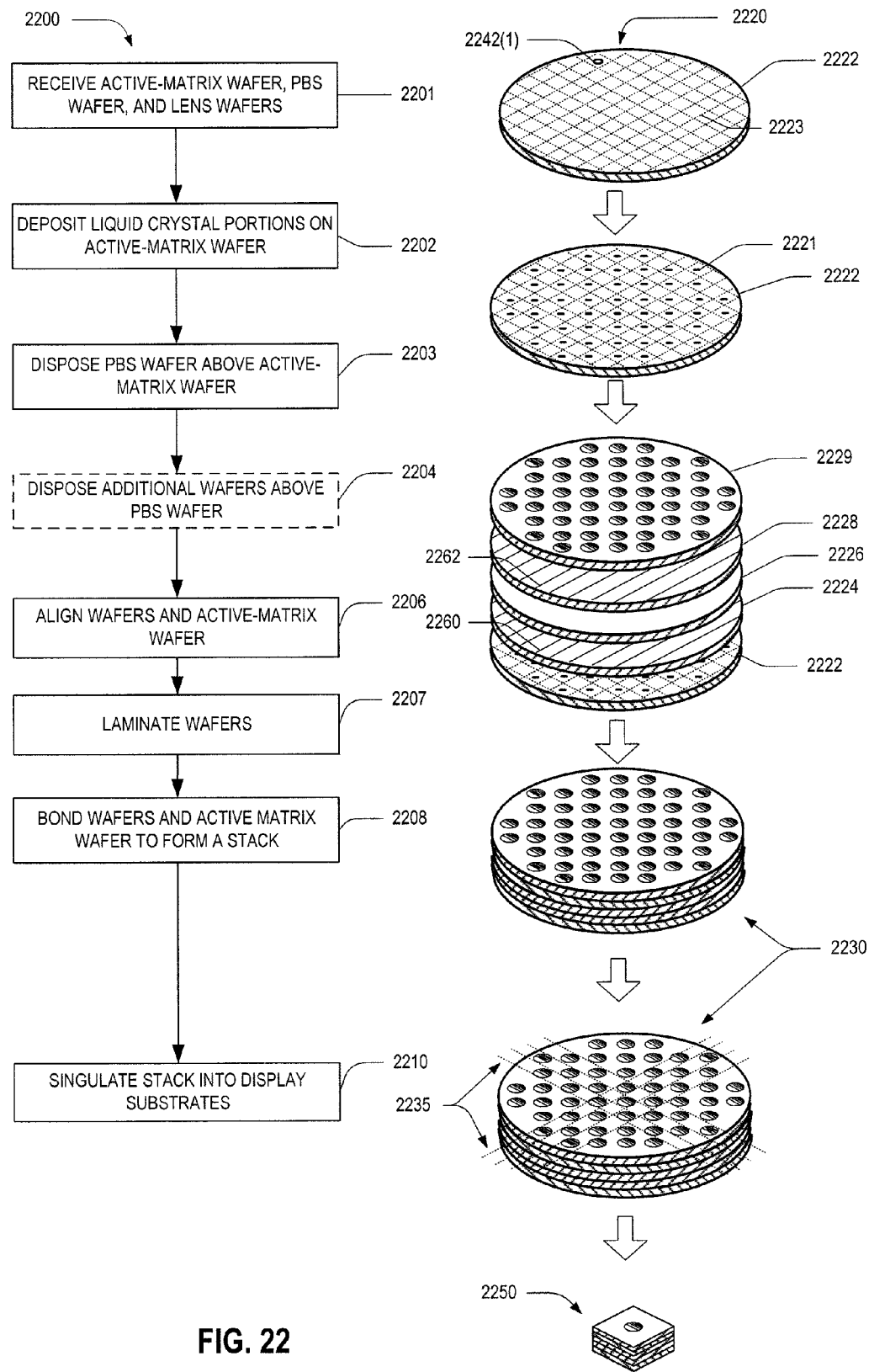
FIG. 22 illustrates a wafer-level method for manufacturing the liquid-crystal-on-silicon assembly of FIG. 20, wherein liquid crystal is added at the wafer-level, according to an embodiment.

FIG. 22 illustrates one exemplary method 2200 of fabricating an LCOS assembly, similar to LCOS assembly 2000 (FIG. 20), with multiple components fabricated at the wafer level. A visual diagram 2220 illustrates steps of method 2200. Method 2200 may be used to fabricate at least a portion of each of optical systems 201 (FIG. 2), 301 (FIG. 3), 400 (FIG. 4), 500 (FIG. 5), and 600 (FIG. 6). Visual diagram 2220 depicts an active-matrix wafer 2222, a PBS wafer 2224, optional tunnel wafer 2226, optional PBS wafer 2228, and optional objective wafer 2229. Active-matrix wafer 2222 includes active matrices 2242. For clarity of illustration, FIG. 22 only illustrates one active matrix. Optional tunnel wafer 2226 may be an optically clear wafer. Optional objective wafer 2229 includes a plurality of imaging objectives, such as imaging objective 250 (FIG. 2). Optional objective wafer 2229 may be a stacked wafer. Method 2200 may be performed with one, all, or none of optional tunnel wafer 2226, optional PBS wafer 2228, and optional objective wafer 2229, without departing from the scope hereof. Additionally, method 2200 may be performed with additional wafers, without departing from the scope hereof.

In FIG. 22, the parallel lines shown on PBS wafer 2224 indicate PBS film bands 2260 within PBS wafer 2224. In an embodiment, the distance between PBS film bands 2260 equals the spacing between rows of imaging objectives in optional objective wafer 2229, and the spacing between rows of active matrices 2242 in active-matrix wafer 2222. Likewise, the parallel lines shown on optional PBS wafer 2228 indicate PBS film bands 2262 within optional PBS wafer 2228. In an embodiment, the distance between PBS film bands 2262 equals the spacing between rows of imaging objectives in optional objective wafer 2229, and the spacing between rows of active matrices 2242 in active-matrix wafer 2222.

In embodiments of PBS wafer 2224 and optional PBS wafer 2228, PBS film bands 2260 and 2262 are multilayer thin-film polarizers known in the art. Other embodiments of PBS wafers 2224 and 2228 may employ different polarization mechanisms, such as wire-grids, without departing from the scope hereof.

In an embodiment, PBS wafer 2224 include a transparent conducting film, indium titanium oxide (ITO) for example, deposited on the side of PBS wafer 2224 facing active-matrix wafer 2222. In an embodiment, PBS wafer includes an alignment layer, for fabrication of LCOS assemblies with an alignment layer between active matrix and the liquid crystal, as illustrated by alignment layer 2043 (FIG. 20) located between active matrix 2022 (FIG. 20) and liquid crystal 2021 (FIG. 20). In such an embodiment, PBS wafer 2224 functions as both the beam-splitting component and a substrate for either or both the transparent conducting layer and the alignment layer needed to form an LCOS display of the LCOS assembly, such as transparent conducting film 2003 (FIG. 20) and alignment layer 2043 (FIG. 20) located between liquid crystal 2021 (FIG. 20) and transparent conducting film 2003. This dual functionality of PBS wafer 2224 eliminates the need for an additional cover glass layer above active matrix wafer 2222, such as cover glass 2004 in LCOS assembly 2000 of FIG. 20. In an embodiment, PBS wafer 2224 includes an anti-reflective (AR) coating and the transparent conducting film, and the PBS film is disposed therebetween. In an embodiment, PBS wafer 2224 includes a polarization filter and the transparent conducting film, and the PBS film is disposed therebetween.

Method 2200 receives active-matrix wafer 2222, PBS wafer 2224, and, optionally, optional tunnel wafer 2226, optional PBS wafer 2228, and optional objective wafer 2229 in a step 2201. In an embodiment, optional tunnel wafer 2226 includes a plurality of lenses 304 (FIGS. 3 and 6) for fabrication of at least a portion of optical system 600 (FIG. 6) or for fabrication of an embodiment of optical system 301 (FIG. 3) that includes lens 304 (FIG. 3). In an embodiment, optional tunnel wafer 2226 or optional PBS wafer 2228 includes a polarization filter, for fabrication of an LCOS assembly that includes polarization filter 302 (FIG. 3). The dotted-line grid on active-matrix wafer 2222 represents dam structures 2223. Active matrices 2242, such as active matrix 2242(1), are located between dam structures 2223. Active-matrix wafer 2222 may include any of the following, as known in the art: a second alignment layer, a reflective layer, and an electrode.

In a step 2202, method 2200 deposits liquid crystal portions 2221, indicated by dashes (-) at locations on active-matrix wafer 2222. The deposition locations on active-matrix wafer 2222 correspond to individual active matrices 2242 of active-matrix wafer 2222. In an example of step 2202, the liquid crystal deposition may be a one-drop fill (ODF) process where portions of liquid crystal are deposited on active-matrix wafer 2222 at positions corresponding to active matrices 2242. Other liquid crystal deposition methods may be employed in method 2200 may change without departing from the scope hereof. Dam structures 2223 contain each liquid crystal portion 2221 to its respective position on active-matrix wafer 2222.

In a step 2203, method 2200 disposes PBS wafer 2224 above active-matrix wafer 2222. In an optional step 2204, method 4400 disposes optional tunnel wafer 2226, optional PBS wafer 2228, and optional objective wafer 2229 above PBS wafer 2224.

In a step 2206, method 2200 aligns PBS wafer 424, and optionally tunnel wafer 2226, PBS wafer 2228, and objective wafer with respect to active-matrix wafer 2222. PBS wafer 2224 is aligned such that PBS film bands 2260 are centered over respective rows of active matrices 2242 within active-matrix wafer 2222. In embodiments of method 2200 that include PBS wafer 2228, PBS film bands 2262 are centered over respective rows of active matrices 2242 within active-matrix wafer 2222. Objective wafer 2229, if included, is aligned such that, within alignment tolerances achievable in the art, for a plurality of imaging objectives of objective wafer 2229, each imaging objective center is collinear with the center of an active matrix on wafer 2222. PBS wafer 2224, and optionally PBS wafer 2228, are aligned such that, within alignment tolerances achievable in the art, PBS film bands 2260 and 2262, respectively, are aligned with rows of imaging objectives of objective wafer 2229 and rows of active matrices 2242 in active-matrix wafer 2222. Step 2206 may employ any alignment method known in the art of wafer-level optics fabrication.

In a step 2207, method 2200 laminates the wafers as known in the art. In a step 2208, method 2200 bonds wafers 2222, 2224, and optionally wafers 2226, 2228, and 2229 to form a wafer stack 2230. In a step 2210, method 2200 singulates wafer stack 2230 along dicing lines 2235, which results in a plurality of wafer-level LCOS assemblies 2250.

Although not illustrated in FIG. 22, a lens wafer, including a plurality of lenses, such as lens 312 (FIGS. 3 and 7), may be disposed between PBS wafer 2224 and active-matrix wafer 2222, without departing from the scope hereof. Accordingly, method 2200 may be used to fabricate at least a portion of optical system 700 (FIG. 7), as well as a portion of an embodiment of optical system 301 (FIG. 3), wherein the embodiment includes lens 312 (FIG. 3).

Figure 23:
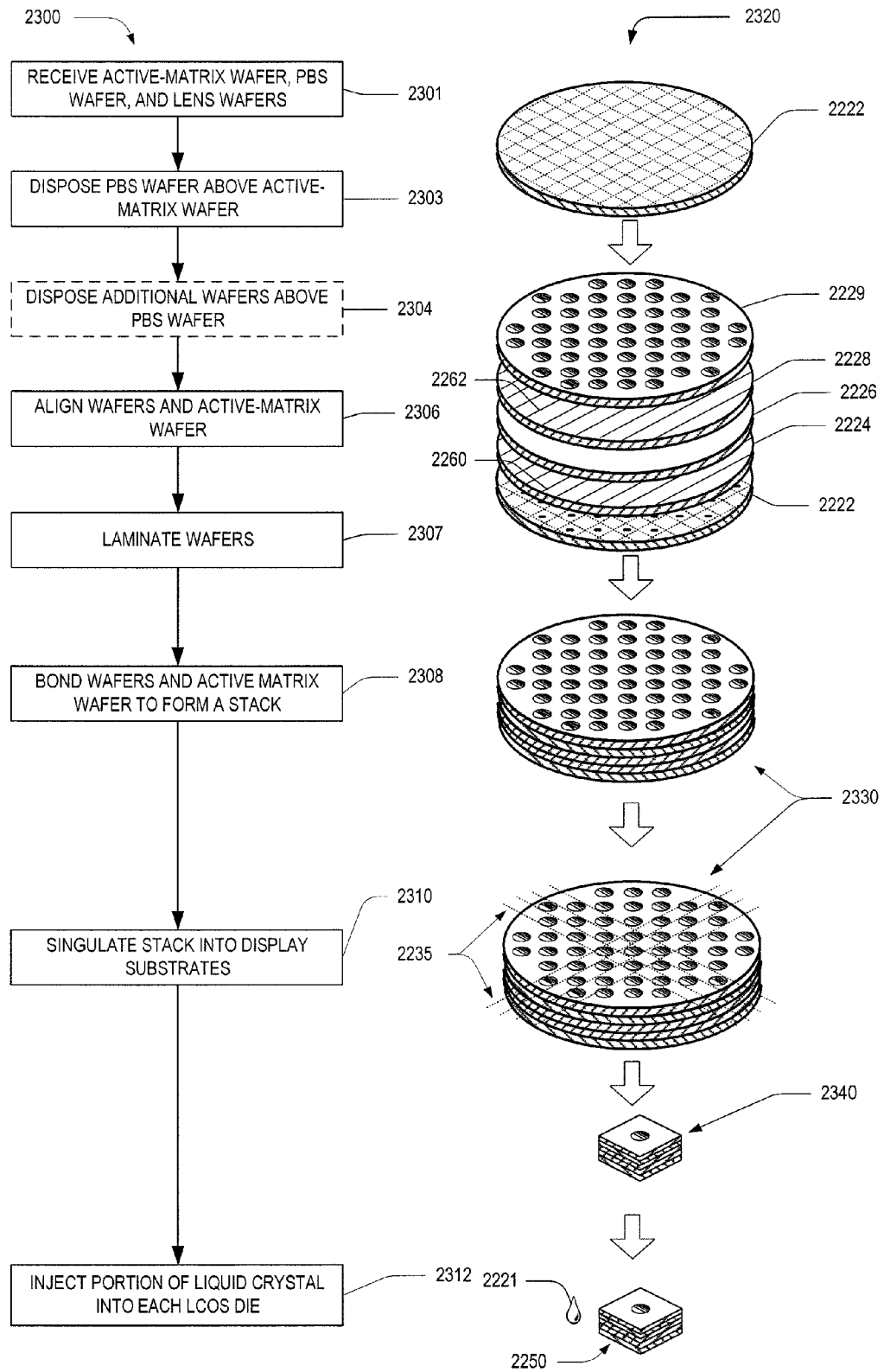
FIG. 23 illustrates another wafer-level method for manufacturing the liquid-crystal-on-silicon assembly of FIG. 20, wherein liquid crystal is added after singulation of liquid-crystal-on-silicon assemblies, according to an embodiment.

FIG. 23 illustrates one exemplary method 2300, which is similar to method 2200 except that the liquid crystal is deposited after singulation step 2210, rather than before. Steps 2301, 2303, 2304, 2306, 2307, 2308, and 2310 of method 2300 are identical to steps 2201, 2203, 2204, 2206, 2207, 2208, and 2210 of method 2200, respectively. Step 2304 is optional. Method 2300 may be used to fabricate at least a portion of each of optical systems 201 (FIG. 2), 301 (FIG. 3), 400 (FIG. 4), 500 (FIG. 5), and 600 (FIG. 6). As discussed for method 2200, method 2300 is extendable to fabrication of at least a portion of optical system 700 (FIG. 7), as well as a portion of an embodiment of optical system 301 (FIG. 3), wherein the embodiment includes lens 312 (FIG. 3).

Bonding step 2308 of method 2300 results in wafer stack 2330, which is identical to wafer stack 2230 (FIG. 22) except that the bottom layer, active-matrix wafer 2222 (FIG. 22), does not include liquid crystal portions 2221 (FIG. 22).

In this case, dam structures 2223 (FIG. 22) support an air gap between active-matrix wafer 2222 and PBS wafer 2224 (FIG. 22) into which a liquid crystal volume may be deposited after dicing.

Whereas in method 2200, step 2210 yields wafer-level LCOS assemblies 2250, step 2310 in method 2300 yields a plurality of LCOS dies 2340. LCOS dies 2340 are identical to LCOS assemblies 2250 (FIG. 22), except that the former lack liquid crystal portions 2221 (FIG. 22).

In step 2312, method 2300 injects liquid crystal portion 2221 (FIG. 22) in the air gap between substrate layer 2223 and PBS layer 2224 of LCOS die 2340 to form wafer-level LCOS assembly 2250 (FIG. 22). In embodiments of method 2300, the liquid-crystal injection step 2312 may employ a method known in the art such as a vacuum-siphon method or a side-injection method.

Figure 24:
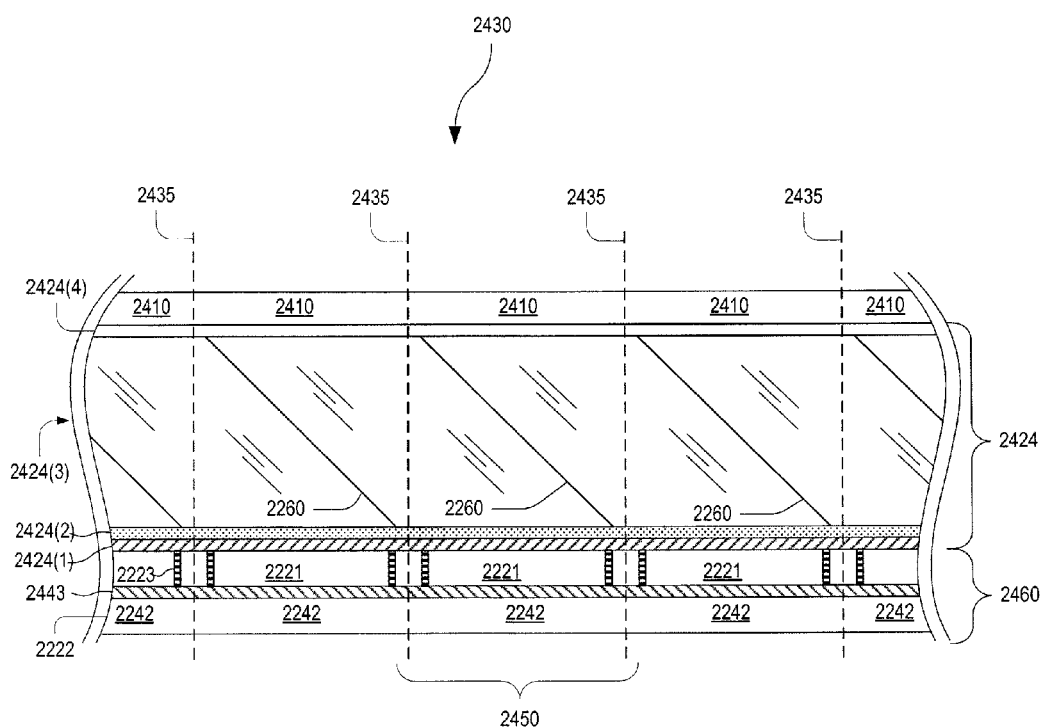
FIG. 24 illustrates a stacked wafer that may be manufactured using either one of the methods of FIG. 22 and FIG. 23, according to an embodiment.

FIG. 24 shows one exemplary cross-section 2430 of an embodiment of wafer stack 2230 of FIG. 22, and individual wafer-level LCOS assemblies 2450 formed from singulation along singulation lines 2435. Cross-section 2430 includes an LCOS layer 2460, a PBS layer 2424, and optional compound optical systems 2410. LCOS layer 2460 and PBS layer 2424 correspond to active-matrix wafer 2222 and PBS wafer 2224, respectively, of FIG. 22. Each of optional compound systems 2410 correspond to a portion of compounded wafers 2226, 2228, and 2229 (FIG. 22).

LCOS layer 2460 includes active-matrix wafer 2222 (FIG. 22), a bottom alignment layer 2443, and liquid crystal portions 2221 contained by dam structures 2223 (FIG. 22). As discussed in connection with FIG. 22, bottom alignment layer 2443 may be deposited on active-matrix wafer 2222 (FIG. 22). Active matrices 2242 (FIG. 22) are included in active-matrix wafer 2222.

PBS layer 2424 includes PBS layer 2424(3), an optional layer 2424(4) which may be an AR coating or a polarization filter, transparent conducting layer 2424(2), and top alignment layer 2424(1). PBS layer 2424(3) includes a PBS film band 2260 (FIG. 22) between each pair of singulation lines 2435. Liquid crystal portions 2421 are between top alignment layer 2424(1) and bottom alignment layer 2443. In an embodiment, PBS film bands 2260 are oriented at substantially 45 degrees to the plane of LCOS layer 2460.

A plurality of wafer-level LCOS assemblies 2450 may be formed by dicing the embodiment of wafer stack 2230 (FIG. 22), illustrated by cross-section 2430, along dicing lines 2435 according to step 2210 of method 2200 (FIG. 22).

Without departing from the scope hereof, liquid crystal portions 2421 may be omitted from cross-section 2430, such that cross-section 2430 represents a cross-section of an embodiment of wafer stack 2330 of FIG. 23. Liquid crystal portions 2421 may be added after singulation along singulation lines 2435, according to step 2312 of method 2300 (FIG. 23) to form individual wafer-level components 2450 that include liquid crystal portions 2421. Thus, wafer-level LCOS assemblies 2450 may be fabricated using method 2200 (FIG. 22) or method 2300 (FIG. 23), and cross-section 2430 illustrates an embodiment of wafer stacks 2230 (FIG. 22) and 2330 (FIG. 23).

Figure 25:
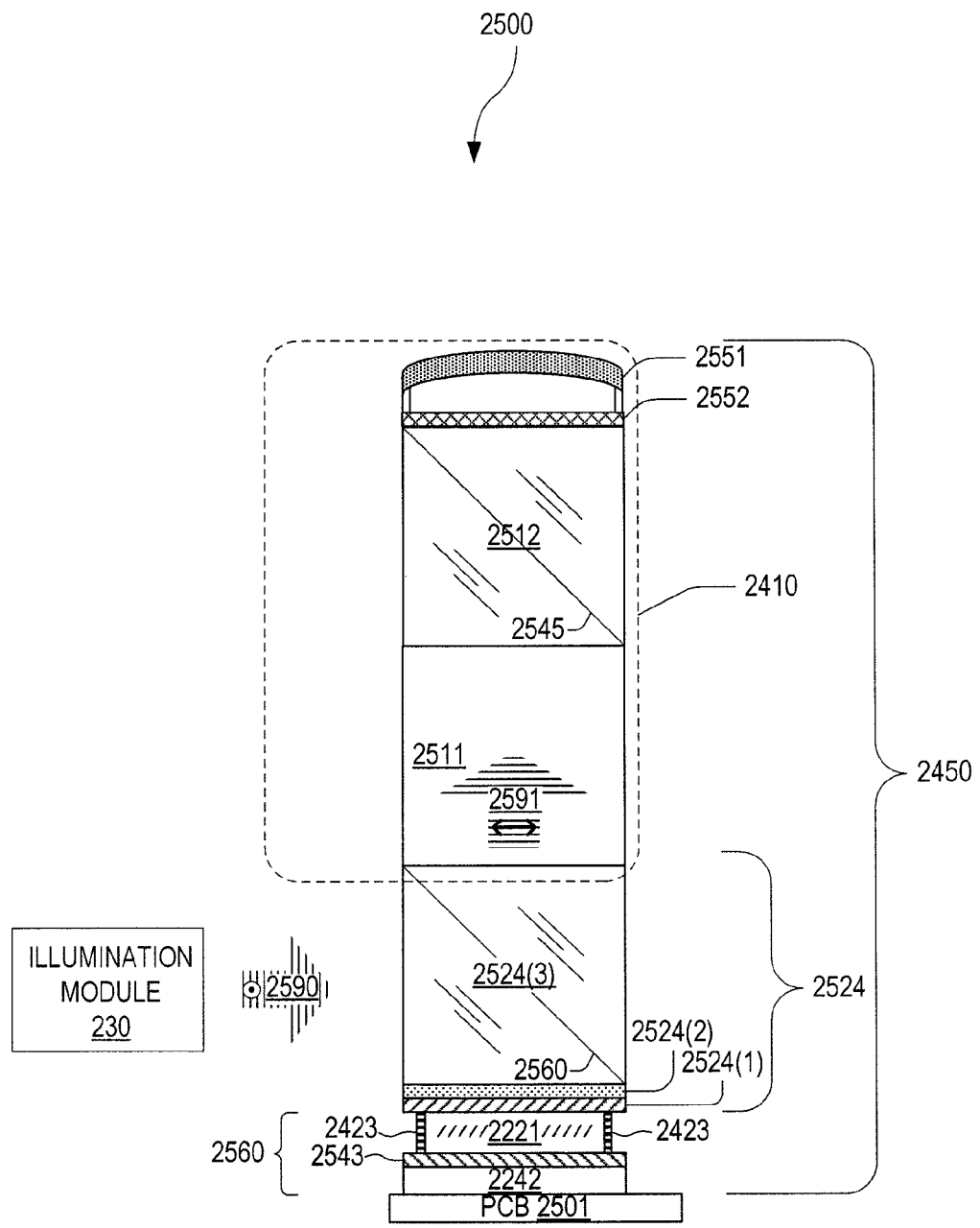
FIG. 25 illustrates a liquid-crystal-on-silicon assembly, which may be implemented in the optical systems of FIGS. 2-7, wherein the liquid-crystal-on-silicon assembly may be manufactured using either one of the methods of FIG. 22 and FIG. 23, according to an embodiment.

FIG. 25 shows one exemplary wafer-level LCOS system 2500, which is an embodiment of at least a portion of each of optical systems 201 (FIG. 2), 301 (FIG. 3), 400 (FIG. 4), 500 (FIG. 5), 600 (FIG. 6), and 700 (FIG. 7). LCOS system 2500 includes wafer-level LCOS assembly 2450 (FIG. 24). Wafer-level LCOS assembly 2450 includes an LCOS section 2560, a PBS section 2524, and optional compound optical system 2410 (FIG. 24). LCOS section 2560 is the portion of LCOS layer 2460 (FIG. 24) located between a pair of adjacent dicing lines 2435 (FIG. 24). PBS section 2524 is the portion of PBS layer 2424 (FIG. 24) located between a pair of adjacent dicing lines 2435 (FIG. 24).

LCOS section 2560 includes active-matrix 2242 (FIG. 22), and optionally a reflective film. Active-matrix 2242 supports liquid crystal portion 2221 (FIG. 22) between a top alignment layer 2524(1) and a bottom alignment layer 2543. Top alignment layer 2524(1) and bottom alignment layer 2543 are portions of top alignment layer 2424(1) and 2443, respectively, of FIG. 24, formed by singulation along singulation lines 2435 (FIG. 24). Dam structure 2223 (FIGS. 22 and 24) contains liquid crystal portion 2221.

PBS section 2524, which is the portion of PBS layer 2424 (FIG. 24) located between a pair of adjacent dicing lines 2435 (FIG. 24), includes a top alignment layer 2524(1), a transparent conducting film 2524(2), PBS element 2524(3) with PBS film band 2560, and optional AR coating or polarization filter 2524(4). Transparent conducting film 2524(2), PBS element 2524(3), and AR coating or polarization filter 2524(4) are portions of transparent conducting layer 2424(2), PBS layer 2424(3), and optional layer 2424(4), respectively, of FIG. 24, where the portions are formed by singulation along singulation lines 2435 (FIG. 24). PBS film band 2560 is formed from PBS film band 2260 (FIG. 22) and is an embodiment of PBS interface 215 (FIG. 2).

Optional compound optical system 2410 includes an optional light tunnel 2511, an optional PBS element 2512 having a PBS interface 2524, an optional quarter-wave plate 2552, and an optional curved reflector 2551. Optional light tunnel 2511 is formed from optional tunnel wafer 2226 (FIG. 22) and is an embodiment of light tunnel 460 (FIGS. 4 through 7). Optional quarter-wave plate 2552 and optional curved reflector 2551 are formed from optional objective wafer 2229 (FIG. 22). Together, optional quarter-wave plate 2552 and optional curved reflector 2551 form an embodiment of imaging objective 250 (FIG. 2). Optional quarter-wave plate 2552 is an embodiment of quarter-wave plate 452 (FIGS. 4 through 7). Optional curved reflector 2551 is an embodiment of curved reflector 451 (FIGS. 4 through 7).

In FIG. 25, wafer-level LCOS assembly 2450 is illuminated by illumination module 230 (FIG. 2). In an embodiment, illumination module 230 emits s-polarized input illumination 2590 that is incident on PBS element 2524(3). In FIG. 25, s-polarization and p-polarization refer to electric field components normal to the figure plane and parallel to the figure plane, respectively.

PBS film band 2560 of PBS element 2524(2) reflects input illumination 2590 through liquid crystal portion 2221, which spatially modulates illumination 2590. Active-matrix substrate 2242 reflects at least a portion of input illumination 2590 back through liquid crystal portion 2221. Individual pixels of active-matrix substrate 2522 may be set to change the polarization state of light propagating through associated sub-portions of liquid crystal portion 2221. In a lit state of a pixel, the double-pass through liquid crystal portion 2221 rotates the polarization state of illumination 2590 to form emitted light that at least includes a p-polarization state. The p-polarized component of the emitted light is transmitted through PBS element 2524(3) as illumination 2591, which is, optionally, further manipulated by compound optical system 2410.

Wafer-level LCOS assembly 2450 may be superior to LCOS assembly 2000 (FIG. 20) in at least two aspects: alignment properties and size. Since the optical components in wafer-level LCOS assembly 2450 are aligned at the wafer level, they are less prone to transverse misalignment than those in LCOS assembly 2000 (FIG. 20), in which optical components are manually aligned. Wafer-level LCOS assembly 2450 is also more space-efficient than LCOS assembly 2000 (FIG. 20), as only the latter requires a cover glass 2004 (FIG. 20) between polarizing beam splitter element 2006 (FIG. 20) and active-matrix substrate 2022 (FIG. 20).

Figure 26:
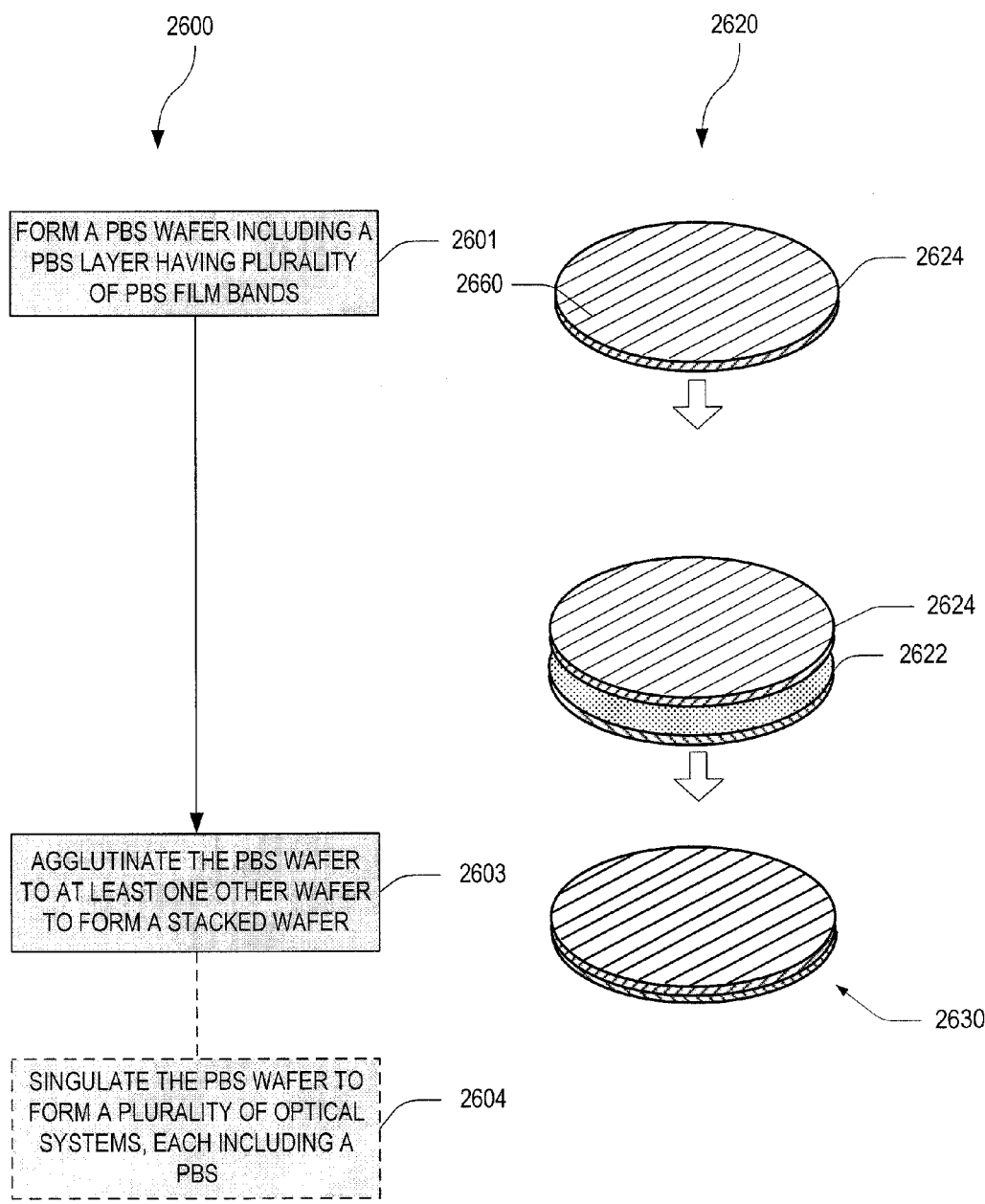
FIG. 26 illustrates a wafer-level method for fabricating a plurality of optical systems that include a polarizing beam splitter, according to an embodiment.

FIG. 26 depicts a wafer-level method 2600, and an associated visual diagram 2620, for fabricating a plurality of optical systems that include a polarizing beam splitter. In a step 2601, method 2600 forms a PBS wafer 2624 including a PBS layer having a plurality of PBS bands 2660. In an embodiment, PBS wafer 2624 includes a substrate and the PBS layer is disposed thereupon. The substrate may function as an alignment layer for an LCOS assembly as discussed in connection with FIGS. 20, 21, 22, 24, and 25. In a step 2602, method 2600 bonds PBS wafer 2624 to a wafer 2622 to form a stacked wafer 2630. In an embodiment, wafer 2622 is a LCOS wafer, such as active-matrix wafer 2222 of FIG. 22. In another embodiment, wafer 2622 is an optical system, such as optional light tunnel wafer 2226 (FIG. 22). In optional step 2604, method 2600 singulates stacked wafer 2630 to form a plurality of optical systems that include a polarizing beam-separator, such as LCOS assembly 2450 (FIG. 24).

The near-eye display systems, devices and methods disclosed herein may be used in conjunction with systems and methods disclosed in co-filed U.S. patent application entitled "Mounting System For Glasses Frames," Ser. No. 14/278,438.

Combinations of Features

Features described above as well as those claimed below may be combined in various ways without departing from the scope hereof. For example, it will be appreciated that aspects of one near-eye display system, device or method described herein may incorporate or swap features of another near-eye display system, device or method described herein. The following examples illustrate possible, non-limiting combinations of embodiments described above. It should be clear that many other changes and modifications may be made to the methods and device herein without departing from the spirit and scope of this invention:

(A1) A near-eye display device may include (a) a display unit having a liquid-crystal-on-silicon (LCOS) display, and a first polarizing beam splitter interface for (i) reflecting illumination light from an illumination module towards the liquid-crystal-on-silicon display and (ii) transmitting display light from the LCOS display based on the illumination light; and (b) a viewing unit having an imaging objective that forms an image of the LCOS display for the pupil based on the display light, and a second polarizing beam splitter interface for (i) reflecting reflected display light from the imaging objective towards the pupil and (ii) transmitting ambient light from an ambient scene towards a pupil, the second polarizing beam splitter interface and the first polarizing beam splitter interface being orthogonal to a common plane.

(A2) The near-eye display device denoted as (A1) may further include a polarization filter located between the display unit and the viewing unit for selecting a linearly polarized component of light propagating from the display unit to the viewing unit.

(A3) In the near-eye display devices denoted as (A1) and (A2), the display unit may include a focusing module for focusing the illumination light onto the LCOS display.

(A4) In the near-eye display device denoted as (A3), the illumination module and focusing module may be located on opposite sides of the first polarizing beam splitter interface.

(A5) In the near-eye display devices denoted as (A3) and (A4), the focusing module may include a mirror for reflecting the illumination light towards the first polarizing beam splitter interface.

(A6) In the near-eye display devices denoted as (A3) through (A5), the focusing module may further include a quarter-wave plate, disposed between the first polarizing beam splitter interface and the mirror, for rotating polarization of the illumination light received from the illumination module by ninety degrees.

(A7) The near-eye display devices denoted as (A1) through (A6) may further include a lens located between the display unit and the viewing unit, for changing magnification of the image of the LCOS display.

(A8) In the near-eye display devices denoted as (A1) through (A7), the display unit may further include a lens located between the first polarizing beam splitter and the LCOS display, for changing magnification of the image of the LCOS display.

(A9) In the near-eye display devices denoted as (A1) through (A8), the illumination module may include a light source and a polarization filter for forming the illumination light as linearly polarized light from the light source.

(A10) In the near-eye display devices denoted as (A1) through (A2), the illumination module may further include a collector for directing emitted light from the light source towards the polarization filter.

(A11) The near-eye display devices denoted as (A1) through (A11) may further include a neutral density filter for reducing brightness of the ambient light of the ambient scene.

(A12) In the near-eye display device denoted as (A11), the neutral density filter may be a variable neutral density filter.

(A13) In the near-eye display devices denoted as (A11) and (A12), the variable neutral density filter may include liquid crystal molecules.

(A14) The near-eye display device denoted as (A13) may further include a controller for varying the brightness of the ambient light based upon twisted nematic effect of the variable neutral density filter.

(B1) A see-through near-eye display device for mounting in field of view of a pupil of a user may include (a) a viewing unit for superimposing a display image, formed by the display device, on an ambient scene, and (b) a neutral density filter for adjusting brightness of ambient light received by the viewing unit from the ambient scene to adjust contrast of the display image relative to the ambient scene.

(B2) The see-through near-eye display device denoted as (B1) may further include a controller for electronically adjusting the brightness of the ambient light based upon a transmission coefficient of the neutral density filter.

(B3) In the see-through near-eye display devices denoted as (B1) and (B2), the neutral density filter may have an adjustable transmission coefficient for adjusting the brightness of the ambient light.

(C1) A method for superimposing a display image on an ambient scene viewed by a pupil of a user may include (a) illuminating a liquid-crystal-on-silicon (LCOS) display by reflecting illumination light, using a first polarizing beam splitter interface, from a light source to the display, and (b) merging, using a second polarizing beam splitter interface, ambient light from the ambient scene with display light from the display, transmitted by the first polarizing beam splitter interface, to superimpose an image of the LCOS display on the ambient scene, the second polarizing beam splitter interface and the first polarizing beam splitter interface being orthogonal to a common plane.

(C2) The method denoted as (C1) may further include filtering polarization of light, using at least one polarization-selective element in addition to the first and second polarizing beam splitter interfaces, to improve quality of the image of the LCOS display.

(C3) In the method denoted as (C2), the at least one polarization-selective element may include a polarization-selective element located between the first and second polarizing beam splitter interfaces for filtering polarization of the display light.

(C4) In the methods denoted as (C1) and (C2), the at least one polarization-selective element may include a polarization-selective element located between the light source and the first polarizing beam splitter interface for filtering polarization of the illumination light.

(C5) The methods denoted as (C1) through (C4) may further include adjusting brightness, using a neutral density filter, of the ambient light of the ambient scene.

(C6) In the method denoted as (C5), the step of adjusting brightness may include electronically changing transmission of the neutral density filter.

(C7) In the methods denoted as (C5) and (C6), the neutral density filter may include liquid crystal molecules.

(C8) In the method denoted as (C7), the step of electronically changing transmission of the neutral density filter may include changing the transmission of the neutral density filter through twisted nematic effect.

(C9) The methods denoted as (C1) through (C8) may further include focusing the illumination light to increase brightness of the display light from the LCOS display.

(C10) The methods denoted as (C1) through (C9) may further include focusing, using a lens, the display light to change magnification of the image of the LCOS display.

(D1) A wafer-level method for manufacturing a near-eye display device may include (a) forming a polarizing beam splitter wafer, having a polarizing beam splitter wafer with a plurality of polarizing beam splitter film bands, and (b) bonding the polarizing beam splitter wafer to an active-matrix wafer to form a stacked wafer, the active-matrix wafer including a plurality of active matrices that each have functionality for forming a liquid-crystal-on-silicon (LCOS) display.

(D2) The wafer-level method denoted as (D1) may further include dicing the stacked wafer to singulate optical elements, wherein each of the optical elements has an active matrix and a polarizing beam splitter film band for reflecting light towards the active matrix and transmitting light received from direction of the active matrix.

(D3) The wafer-level method denoted as (D1) may further include depositing liquid crystal on the active-matrix substrate to form a plurality of LCOS displays.

(D4) The wafer-level method denoted as (D2) may further include depositing liquid crystal on the active-matrix substrate to form a plurality of LCOS displays.

(D5) The wafer-level method denoted as (D2) may further include depositing liquid crystal, for each of the optical elements, on the active-matrix to form at least one LCOS display.

(D6) The wafer-level methods denoted as (D2), (D4), and (D5) may further include bonding each of the plurality of optical elements to other optical elements to form the near-eye display, wherein the other optical elements include a polarizing beam splitter interface for merging display light from the LCOS display with ambient light from an ambient scene.

(D7) The wafer-level methods denoted as (D1) through (D6) may be used to manufacture at least a portion of each of the near-eye display devices denoted as (A1) through (A14) and (B1) through (B3).

(E1) A near-eye display system may include (a) a near-eye display device, having a display and capable of providing, to a pupil of a user, an image from the display superimposed on an ambient scene, and (b) a fixture for coupling the near-eye display device to a holder mounted to the user, the fixture having a plurality of degrees of freedom for alignment of the display device with respect to the pupil.

(E2) In the near-eye display system denoted as (E1), the display may include a liquid-crystal-on-silicon (LCOS) display.

(E3) In the near-eye display systems denoted as (E1) and (E2), the plurality of degrees of freedom may include at least one translational degree of freedom.

(E4) In the near-eye display systems denoted as (E1) through (E3), the at least one translational degree of freedom may include translation of the near-eye display device, in a direction non-parallel to a viewing axis from the pupil to the image of the display, for moving position of the image of the display to a desired position in a field of view of the pupil.

(E5) In the near-eye display systems denoted as (E1) through (E4), the at least one translational degree of freedom may include two translational degrees of freedom.

(E6) In the near-eye display system denoted as (E5), the two translational degrees of freedom may be substantially orthogonal to one another.

(E7) In the near-eye display systems denoted as (E3) through (E6), the fixture may include a telescoping section for providing one of the at least one translational degree of freedom.

(E8) In the near-eye display systems denoted as (E1) through (E7), the plurality of degrees of freedom may include two rotational degrees of freedom for changing keystone distortion of the image of the display.

(E9) In the near-eye display system denoted as (E8), the fixture may include two pivot joints for providing the two rotational degrees of freedom.

(E10) In the near-eye display systems denoted as (E8) and (E9), the two rotational degrees of freedom being substantially orthogonal to one another.

(E11) In the near-eye display systems denoted as (E1) through (E10), the plurality of degrees of freedom may include two rotational degrees of freedom for positioning the image of the display orthogonally to a viewing axis from the pupil to the image of the display.

(E12) In the near-eye display systems denoted as (E1) through (E11), the plurality of degrees of freedom may include two translational degrees of freedom and two rotational degrees of freedom.

(E13) In the near-eye display systems denoted as (E8) through (E11), the two translational degrees of freedom may move the position of the image of the display to a desired position in field of view of the pupil.

(E14) In the near-eye display systems denoted as (E8) through (E11), the two rotational degrees of freedom may change keystone distortion of the image of the display.

(E15) In the near-eye display systems denoted as (E1) through (E14), the near-eye display device may be any one of near-eye display devices (A1) through (A14) and (B1) through (B3).

(E16) In the near-eye display systems denoted as (E1) through (E14), at least portions of the near-eye display device may be manufactured using any one of the wafer-level methods denoted as (D1) through (D7).

(E17) In the near-eye display systems denoted as (E1) through (E14), the near-eye display device may function according to any one of the methods denoted as (C1) through (C10).

(F1) A method for aligning a display image superimposed on an ambient scene viewed by a pupil of a user may include manipulating a plurality of degrees of freedom of a fixture, coupling a near-eye display device to a holder that mounts on the user, to align the display image with respect to pupil field of view.

(F2) In the method denoted as (F1), the near-eye display device may include a display and optics for forming, from the display, the display image and superimposing the display image on the ambient scene.

(F3) In the methods denoted as (F1) and (F2), the step of manipulating may include translating the near-eye display device, relative to holder, to move the position of the image of the display to a desired position in the field of view of the pupil.

(F4) In the method denoted as (F3), the step of translating may include modifying the length of a telescoping section of the fixture.

(F5) In the methods denoted as (F3) and (F4), the step of translating may include translating the near-eye display device with respect to the holder, in two non-parallel directions.

(F6) In the methods denoted as (F1) through (F5), the step of manipulating may include rotating the near-eye display device about two substantially orthogonal axes to change keystone effect of the image of the display.

(F7) In the methods denoted as (F1) through (F6), the step of manipulating may include rotating the near-eye display device about two substantially orthogonal axes to position the image of the display orthogonally to a viewing axis from the pupil to the image of the display.

(F8) In the methods denoted as (F1) through (F7), the step of manipulating may include (a) translating the near-eye display device, relative to the holder, to move the position of the image of the display to a desired position in the field of view of the pupil, and (b) rotating the near-eye display device about two substantially orthogonal axes to change keystone effect of the image of the display.

(F9) In the methods denoted as (F1) through (F2), the near-eye display device may be any one of the near-eye display devices denoted as (A1) through (A14) and (B1) through (B3).

(F10) In the methods denoted as (F1) through (F2), the near-eye display device may function according to any one of the methods denoted as (C1) through (C10).

(G1) A method for manufacturing a display system, having functionality for aligning a display image with respect to a pupil of a user, may include producing a fixture for coupling a near-eye display device to a holder for mounting the display device on the user, wherein the fixture includes a plurality of degrees of freedom for moving the near-eye display device relative to the holder.

(G2) In the method denoted as (G1), the near-eye display device may include a display and capable of superimposing an image of the display on an ambient scene viewed by the user (G3) In the methods denoted as (G1) and (G2), the step of producing may include manufacturing the fixture with at least one translational degree of freedom for moving the position of the display image to a desired position in a field of view of the pupil.

(G4) In the methods denoted as (G1) through (G3), the step of manufacturing may include forming a telescoping section of the fixture.

(G5) In the methods denoted as (G1) through (G4), the step of manufacturing may include manufacturing the fixture with two translational degrees of freedom for moving the position of the image of the display to a desired position in field of view of the pupil.

(G6) In the methods denoted as (G1) through (G5), the step of producing may include manufacturing the fixture with at least two rotational degrees of freedom for changing keystone distortion of the image of the display.

(G7) In the method denoted as (G6), the step of manufacturing may include incorporating, into the fixture, at least two pivot joints for providing the at least two rotational degrees of freedom, respectively.

(G8) In the method denoted as (G7), the step of incorporating may include incorporating, into the fixture, the two pivot joints with substantially orthogonal pivots.

(G9) The methods denoted as (G1) through (G8) may further include producing the near-eye display device using any one of the wafer-level methods denoted as (D1) through (D7).

(G10) In the methods denoted as (G1) through (G8), the near-eye display device may be any one of the near-eye display devices denoted as (A1) through (A14) and (B1) through (B3).

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and device, which, as a matter of language, might be said to fall therebetween.

What is claimed is:

1. A near-eye display device, comprising:
    a display unit having:
        a liquid-crystal-on-silicon (LCOS) display for generating display light from illumination light incident thereon,
        a first polarizing beam splitter interface,
        an illumination module including at least one light source for generating the illumination light,
        a mirror for (i) receiving the illumination light from the illumination module after transmission of the illumination light through the first polarizing beam splitter interface and (ii) reflecting the illumination light back to the first polarizing beam splitter interface for reflection thereby toward the LCOS display, the mirror and the illumination module being positioned on opposite sides of the first polarizing beam splitter interface; and
    a viewing unit for receiving the display light from the LCOS display after transmission of the display light through the first polarizing beam splitter interface, the viewing unit having
        an imaging objective that forms an image of the LCOS display for a pupil based on the display light, and
        a second polarizing beam splitter interface for (i) reflecting reflected display light from the imaging objective towards the pupil and (ii) transmitting ambient light from an ambient scene towards the pupil, the second polarizing beam splitter interface and the first polarizing beam splitter interface being orthogonal to a common plane.

2. The near-eye display device of claim 1, further comprising a polarization filter located between the display unit and the viewing unit for selecting a linearly polarized component of light propagating from the display unit to the viewing unit.

3. The near-eye display device of claim 1, the display unit further comprising a focusing module for focusing the illumination light onto the LCOS display.

4. The near-eye display device of claim 3, the illumination module and focusing module located on opposite sides of the first polarizing beam splitter interface.

5. The near-eye display device of claim 1, further comprising a quarter-wave plate, disposed between the first polarizing beam splitter interface and the mirror, for rotating polarization of the illumination light received from the illumination module by ninety degrees.

6. The near-eye display device of claim 1, further comprising a lens located between the display unit and the viewing unit, for changing magnification of the image of the LCOS display.

7. The near-eye display device of claim 1, further comprising a lens, located between the first polarizing beam splitter interface and the LCOS display, for changing magnification of the image of the LCOS display, the illumination light and the display light passing through the lens.

8. The near-eye display device of claim 1, the illumination module further including a polarization filter for forming the illumination light as linearly polarized light.

9. The near-eye display device of claim 8, the illumination module further including a collector for directing emitted light from the light source towards the polarization filter.

10. The near-eye display device of claim 1, further comprising a neutral density filter for reducing brightness of the ambient light of the ambient scene.

11. The near-eye display device of claim 10, the neutral density filter being a variable neutral density filter.

12. The near-eye display device of claim 11, the variable neutral density filter including liquid crystal molecules, the near-eye display device further comprising a controller for varying the brightness of the ambient light based upon twisted nematic effect of the variable neutral density filter.

13. The near-eye display device of claim 1, the first polarizing beam splitter interface being implemented in a beamsplitter cube, the illumination module and the mirror being positioned adjacent opposite facing first and second surfaces, respectively, of the beamsplitter cube, the LCOS display being positioned adjacent a third surface of the beamsplitter cube, the third surface being orthogonal to the first and second surfaces.

14. The near-eye display device of claim 13, further comprising a light tunnel for receiving display light emanating from a fourth side of the beamsplitter cube, the fourth side being opposite the third side.

15. The near-eye display device of claim 1, the mirror being a curved mirror for focusing the illumination light.

16. The near-eye display device of claim 1, the display unit further comprising a lens positioned between the first polarizing beam splitter interface and the mirror for focusing the illumination light.

* * * * *